United States Patent
Gavillet

(10) Patent No.: US 7,123,708 B1
(45) Date of Patent: Oct. 17, 2006

(54) NEUTRAL TANDEM TELECOMMUNICATIONS NETWORK PROVIDING TRANSITING, TERMINATING, AND ADVANCED TRAFFIC ROUTING SERVICES TO PUBLIC AND PRIVATE CARRIER NETWORKS

(75) Inventor: Ronald William Gavillet, Glencoe, IL (US)

(73) Assignee: NT Investors, Inc.

( * ) Notice: Subject to any disclaimer, the term of this patent is extended or adjusted under 35 U.S.C. 154(b) by 530 days.

(21) Appl. No.: 10/087,363

(22) Filed: Mar. 1, 2002

Related U.S. Application Data

(60) Provisional application No. 60/272,437, filed on Mar. 1, 2001.

(51) Int. Cl.
*H04M 7/00* (2006.01)

(52) U.S. Cl. .................................. 379/219; 379/220.01

(58) Field of Classification Search ................ 379/219, 379/220.01, 221.08, 221.13, 221.15, 224, 379/229, 230, 240
See application file for complete search history.

(56) References Cited

U.S. PATENT DOCUMENTS

| | | | | |
|---|---|---|---|---|
| 5,930,348 A * | 7/1999 | Regnier et al. | ........ | 379/221.01 |
| 6,359,979 B1 * | 3/2002 | Wang et al. | ........... | 379/221.01 |
| 6,804,229 B1 * | 10/2004 | Landaveri et al. | .......... | 370/386 |
| 2001/0034796 A1 * | 10/2001 | Zebian | ....................... | 709/245 |
| 2001/0038689 A1 * | 11/2001 | Lijestrand et al. | | |
| 2002/0052915 A1 * | 5/2002 | Amin-Salehi | | |
| 2003/0016675 A1 * | 1/2003 | Underwood et al. | | |
| 2003/0067903 A1 * | 4/2003 | Jorgensen | | |
| 2003/0161296 A1 * | 8/2003 | Butler et al. | ................. | 370/352 |
| 2003/0194078 A1 * | 10/2003 | Wood et al. | ................. | 379/224 |
| 2003/0198216 A1 * | 10/2003 | Lewis | ......................... | 370/352 |
| 2004/0057427 A1 * | 3/2004 | Christie et al. | ............. | 370/352 |
| 2004/0233909 A1 * | 11/2004 | Allen, Jr. et al. | | |

* cited by examiner

*Primary Examiner*—William J. Deane, Jr.
(74) *Attorney, Agent, or Firm*—Woodcock Washburn LLP

(57) ABSTRACT

A neutral tandem telecommunications network providing public and private wireline and wireless carrier networks connectivity amongst themselves ("transit traffic") and between themselves and metropolitan local exchange carrier ("LEC") central offices ("terminating traffic") as a substitute for utilizing the LEC public switched telephone network ("PSTN") tandems. Telecommunications switching equipment for a Neutral Tandem Network ("NTN") is located at various points in a metropolitan area and used to provide switching connectivity services for traffic passing (i) between carrier networks connected at any point to the NTN as well as (ii) between the carrier networks and the metropolitan LEC central offices and (iii) between the carrier networks and advanced traffic routing services. The services are provided using a metropolitan switch or a soft switch as a higher level in the switching hierarchy above the current RBOC tandems, where the switch has hardwired connections (i) between metropolitan carrier networks and the NTN and (ii) between the NTN and LEC central offices and tandems.

23 Claims, 24 Drawing Sheets

Ameritech LATA 357 Tandem Trunking Requirements

Neutral Tandem Network

Ameritech LATA 357 Tandem Trunking Requirements

NEUTRAL TANDEM TELECOMMUNICATIONS NETWORK PROVIDING TRANSITING, TERMINATING, AND ADVANCED TRAFFIC ROUTING SERVICES TO PUBLIC AND PRIVATE CARRIER NETWORKS

This Application: claims benefit of U.S. provisional Application Ser. No. 60/272,437 filed Mar. 1, 2001.

BACKGROUND OF INVENTION

1. Field of the Invention

The present invention relates generally to a telecommunications system for providing a neutral metropolitan area tandem switch network independent of the incumbent local exchange carriers and, in particular, to a system that bypasses the incumbent local exchange carrier tandem switch by creating a higher level in the switching hierarchy above the current RBOC tandems with respect to switching carrier traffic between carriers and switching and transporting traffic between the carriers and the local exchange carrier (LEC) metropolitan central offices and the LEC Advanced Traffic Routing Services.

2. Description of the Prior Art

As the wireline and wireless telephone industry has evolved into a competitive market over the past two decades, one segment of the market has largely remained unchanged, namely, the manner in which traffic is routed into and out of a metropolitan region and between carriers serving those regions. In such cases, a LEC tandem network continues to be used. As will be explained below, this situation is a limitation to the continued expansion of the wireline and wireless telephone industry. An improved method and apparatus for routing such traffic is desired.

One segment of the wireline and wireless telephone industry that has had explosive growth since the divestiture of AT&T has been wireless carriers. Traditionally, the termination of calls to RBOC customers, depending on a call's duration and cost per minute, constitute upwards of 40% of the overall cost of the long distance call. In addition, the Telecommunications Act of 1996 allows the RBOCs to apply for entry into the long distance market. The FCC has granted some of these applications, and it is expected to grant significantly more shortly. Thus, the long distance carriers, like the CLECs and wireless carriers, now face the challenge of both competing with the RBOCs while paying fees for accessing their network.

With respect to wireline or wireless carriers providing local calling in a metropolitan area, these carriers traditionally interconnect their networks as well to the LEC network at the LEC tandems, as opposed to establishing connections to every central office served by the tandems, which can easily run between 20 and 50 central offices for each tandem in a metropolitan area. When terminating a local call to a RBOC local service customer, these competitive wireline and wireless carriers, similar to the long distance carriers, are charged tandem switching and transport between the LEC tandem and the terminating local central office. Depending on the LEC retail local calling plan, the rates for tandem switching and termination charged competitive carriers on a per call basis for terminating a call to a LEC local service customer can exceed the retail rate charged a LEC customer for making a similar call, thus making competing with the LEC extremely uneconomic. This vestige of the RBOCs' past legal monopoly makes it more difficult for competitive carriers by providing the RBOCs with a cross-subsidy that can be used to compete against the CLECs. While in theory the payment for terminating a call is reciprocal, because the RBOC started with nearly 100% market share, it will be years before the RBOC's face a material financial exposure for such terminating charges to be paid to CLECs, whereas CLECs view such charges as a barrier to entry and many have structured their networks and business plans in an attempt to minimize the impact of such fees. Moreover, to the extent a competitor is dependent on the LEC to be responsive in providing access to a portion of its network, that competitor risks its success. For example, there have been reports of the RBOCs not sufficiently growing their tandem networks to meet the capacity required by new competitive carriers. As a result, the competitors risk providing a deteriorating level of service (e.g., a high rate of busy signals) or incurring uneconomic network deployments to circumvent tandem bottlenecks and connect directly to high traffic RBOC central offices.

This dependence by competitive carriers on the RBOC tandem networks is exacerbated by the fact that not only are the competitors using the tandems to route traffic between the RBOC network and their networks, but also the RBOC tandems have become a point at which overlapping networks in a metropolitan area interconnect. Thus, the RBOC tandems by default have become the points at which competitors route traffic amongst themselves (transit traffic). Just as with traffic that terminates to customers of the RBOC, the RBOC is paid a fee by the competitive carriers for carrying this transit traffic even when an RBOC customer is not the called party. As a result, as competitors gain market share against the RBOC and exchange between themselves, the traffic really never leaves the tandem network; it continues to ride the RBOC network as transit traffic. These transit fees, of course, act to cross-subsidize the RBOC in its competition with these competitive networks. However, the RBOCs have little interest in supporting such traffic (i.e., traffic passing between two competitors) with capital improvements, prompt: customer service and order fulfillment. Indeed, the RBOCs have a disincentive to support such traffic, because deteriorating the quality of such transiting traffic could lead customers of a competitive carrier to return to the RBOCs as retail customers. The present alternative for competitive carriers seeking to exchange traffic between each other without going through the RBOC is for the competitive carriers to directly connect facilities between each other. Because of the varying amounts of traffic between such carriers as well as the traffic imbalance and the large and ever changing number of such carriers, this would be prohibitively uneconomic.

With its entrenched monopoly status, the RBOC are generally free to dictate the various technical interconnection requirements for metropolitan area networks needing to interconnect with the RBOC. These interconnection requirements, in addition to the fees charged for interconnection, increase substantially the costs for carriers to interconnect with the RBOC. Most challenging, the RBOC requires all carriers interconnecting with its network to do so on technical specifications dictated not by the advances in the market for technology, but by the legacy technical infrastructure of the RBOC circuit switch network. As a result, carriers with advanced, high capacity networks have to reduce their networks' efficiency each time they interconnect with the RBOC network. The following is an example of the types of costly, duplicative, and complex interconnection requirements facing a metropolitan CLEC needing to connect with the local RBOC to serve a metropolitan region. Wireless carriers and, to a lesser extent, long distance carriers (because they do not provide local calling, but only require interconnection for originating and terminating long distance calls) face a similar maze of complexity and cost when interconnecting with the RBOC:

As commonly prescribed by the interconnection requirements between RBOCs and CLECs, at least five (5) types of trunk groups must be planned, transported and terminated for each CLEC switch interconnected in an RBOC-served metropolitan area:

Trunk Group 1—Dedicated Local and dedicated IntraLATA Trunk Group(s) in Each Local Exchange Area Trunk Group 2—InterLATA (Meet Point) Trunk Group routes to Access Tandem Trunk Group 3—E911 Trunk Group to primary and redundant E911 Tandems Trunk Group 4—High Volume Call In (HVCI)/Mass Calling (Choke) Trunk Group routes to HVCI Tandem Trunk Group 5—Operator Services/Directory Assistance Trunk Group(s) routes to OS/DA Tandem As the following figures show, these trunking requirements rapidly become complex, redundant, and costly.

FIG. 1a Trunk Group 1a: A Single, Separate Local Tandem 10, Access Tandem 12. For each RBOC Local Tandem 10 in a metropolitan area, a separate transport facility must be connected to carry local calls originated in that local area for termination via switch 14 to RBOC customers in that local area. For each Access Tandem 12 in a metropolitan area, a separate transport facility must be established for IntraLATA calls originated in that LATA for termination via switch 14 to RBOC customers in that LATA.

FIG. 1b Trunk Group 1b: Combined Local and Access Tandems 16. In some situations, an RBOC may have a tandem switch functioning as a combined Local and Access Tandem 16. In those situations, a CLEC may combine local and IntraLATA traffic on the same transport facility to the combined Local and Access Tandem, but the CLEC must still (as described in FIG. 4 below) establish a separate transport facility just for Trunk Group 2, InterLATA traffic, even though it is terminating at the same combined Local and Access Tandem.

FIG. 2 Multiple Tandems 18 in a Metropolitan Area: Within each of these 5 trunk groups, additional separate trunks may be required based on growth and the number of tandems established by the RBOC. For example, in a large metropolitan area, such as the Chicago metropolitan area, there are currently eight combined Local and Access Tandems 18 in five separate locations, each serving specific Local Exchange Areas. As a result, a CLEC serving the Chicago metropolitan area must establish a Trunk Group 1b connection for each of the eight tandems 18 in the metropolitan area. Those skilled in the art should note that this is an example of the tandem interconnection required by Ameritech in Chicago LATA 357, and that the other LECs may require slightly different processes for the same purpose.

FIG. 3 RBOC Interconnection Rules Increase Cost: For Local Trunk Groups in each Local Exchange Area, the RBOC often establishes interconnection requirements that increase costs and complexity further, providing for example that:

Inter-Tandem switching is not allowed—i.e., a CLEC cannot pass traffic through one tandem to reach another tandem even in the event of overflow, but must have multiple dedicated tandem connections to each tandem. Additional dedicated trunks can be required—for example, where traffic from a CLEC switch to specific RBOC Central Office or end office 20 reaches a quantity to support, in the RBOC's opinion, a dedicated facility between the CLEC and the RBOC the Central Office (e.g., 24 or more trunks) a dedicated local trunk group shall also be established by the CLEC to the RBOC End Office (EO) 20, thus causing the CLEC to incur additional port, transport and planning costs.

FIG. 4 Trunk Group 2—InterLATA (Meet Point) Trunk Group 2: RBOCs require a separate facility=22 for traffic passing between a CLEC's customers and long distance carriers connected to the RBOCs' tandem networks. Again, many RBOC requirements increase the cost and complexity of these connections:

A dedicated InterLATA trunk group will be established for the transmission and routing of access traffic between CLEC's customers and long distance carriers sending or receiving long distance traffic from such customers via the RBOC Access Tandem 18.

When the RBOC has more than one Access Tandem 18 in a LATA, the CLEC must establish an InterLATA trunk group to each RBOC Access Tandem 18.

In no event will the RBOC route traffic through more than one Tandem 18 for connection to/from long distance carriers.

FIG. 5 Trunk Group 3—E911 Trunk Group: To serve a metropolitan area, a CLEC often is required to connect to multiple E911 Trunk Groups.

A dedicated trunk group for each calling area shall be established to each appropriate E911 Tandem 24 within the local exchange area in which CLEC offers exchange service.

FIG. 6 Trunk Group 4—High Volume Call In (HVCI)/Mass Calling (Choke) Trunk Group: To serve a metropolitan area, a CLEC is also required to establish:

A dedicated trunk group to the designated Public Response HVCI/Mass Calling Network Access Tandem 26 in each serving area FIG. 7 Trunk Group 5—Operator Services/Directory Assistance/Busy Line Verification/EI Trunk Group(s): To serve a metropolitan area, a CLEC is also required to establish a dedicated trunk groups to enable:

Busy Line Verification/Emergency Interrupt (BLV/EI)
Operator Assistance (0+, 0−)
Directory Assistance Call Completion (DACC)
Directory Assistance (DA)

Thus, at a minimum, a CLEC launching service in the Chicago metropolitan area must establish at least 20 separate T-1 trunk groups to support interconnecting to Ameritech's 11 tandem switches 18, 24, 26, 28 in LATA 357.

FIG. 8 CLEC Costs Increase with Interconnection Complexity: FIG. 8 is an example of the cost incurred by the CLEC to arrange for such interconnections. The cost includes: switch port costs on the CLEC's switch 14, interconnection electronics 30, 31, 32 for the network transport, network planning costs, network transit costs to the interconnection points, multiplexing equipment 34, 36 at the Tandem Central Office, switch port costs on the Tandem switch and usage based switching fees charged by the RBOC to the CLEC. Because the RBOC limits the interconnection speeds to those compatible with its legacy circuit switches, CLECs incur unnecessary inefficiency in reducing their high bandwidth networks down to the T-1 and DS-3 levels of interconnection speed prescribed by the RBOCs.

As shown in FIG. 9, RBOC tandem interconnection trunking complexity increases exponentially in a region as both the type of public and private carrier networks increase (e.g., CLECs, wireless, cable television, long distance) and the absolute number of such carriers increase. As traffic between these carriers grows, RBOC policies and interconnection requirements continue to significantly increase planning complexity and costs while reducing network efficiency. For example, RBOC interconnection rules generally require that when transit traffic through a tandem (e.g. 38) from one CLEC to another CLEC or wireless carrier requires 24 or more trunks, the CLEC shall establish a direct trunk group between itself and the other CLEC or wireless carrier and not use the tandem 38 for traffic between such carriers. This requirement is similar to the requirement that a CLEC establish dedicated trunks to an end office when the CLEC's traffic terminating to the particular RBOC end office requires 24 or more trunks (see FIG. 3). Establishing such dedicated trunks adds additional costs for the competitive carriers by reducing switch port capacity, adding transport management and electronics, and reducing tandem trunking efficiency. As CLEC and wireless carriers grow and dedicated facilities are required among such carriers and between such carriers and the RBOC end offices, the fundamental premise of utilizing a switch to interconnect these overlapping carrier networks is destroyed, thus increasing cost for competitors. Without tandem switching, carriers would have to establish a mass of inefficient dedicated facilities as illustrated in FIG. 10. Above all, therefore, there exists a need to promote the development of a network alternative that breaks the cycle of relying on (and paying fees for) the RBOC network at the same time as competing with the RBOC. The more that neutral or independent network components are available to carriers competing with the RBOCs, the more that the forces of competition will develop in the telecommunications market. Such facilities can promote competition by being both competitor neutral—i.e., not establishing unreasonable rates or practices in an effort to deter competition—and technology neutral—i.e., not preferring a specific technology for anti-competitive reasons.

However, to date, no solution has been proposed which would enable a company independent of the RBOCs to provide critical functions of the local telephone network on a broad scale at a competitive cost. There is thus a great need in the art for a system and method which would enable a company independent of the RBOCs to provide cost competitive components of the local telephone network, and hence enable meaningful competition to the incumbent RBOCs in the local, wireless and long distance markets, without requiring a cost prohibitive infrastructure investment.

Accordingly, a LEC bypass technique is desired which promotes cost-effective competition with the LECs without requiring uneconomic significant infrastructure investment. Embodiments of the present invention have been designed to meet this great need in the art.

In addition to reducing the dependence by carriers on its competitor, the LEC, embodiments of the present invention have also been designed to meet another great need in the art, the need to significantly reduce the charges assessed by the LECs on most (i) long distance calls and (ii) local wireline (e.g., CLECs) and wireless (e.g., cellular) call terminations and the related traffic inefficiency, which cost consumers tens of billions of dollars each year.

Bypassing the LEC tandems and the associated inefficiencies could save the IXCs, CLECs and wireless carriers a significant portion of their service costs for providing telecommunications services and, once the associated savings are passed on to their subscribers, potentially save their customers billions of dollars each year. These cost savings from such LEC bypass will come in many forms. For example, the proprietor of the neutral tandem network (NTN) described below will be in a position to price their services dramatically different from the current RBOC interconnection pricing. Today, the RBOC's disparate, inefficient tandem connections covering discrete geographic areas require carriers to establish multiple connections to pass traffic across a given metropolitan area; each connection requiring separate monthly connection fees. The RBOCs also require carriers to separate traffic based on traffic types, e.g., local traffic versus long distance traffic. The proprietor of the NTN of the invention will enable carrier to terminate all such traffic using dramatically fewer connections, thus reducing carriers interconnection cost. Also, reducing interconnection points for terminating traffic will reduce the number of ports on carriers switches required to terminate such traffic, thus saving the carriers capital cost on their switches, which can be otherwise uses to create revenue producing services. Finally, carrier customers will find that they need fewer engineering resources for managing their interconnections because the NTN of the invention simplifies the establishment of such connections by essentially outsourcing the carrier interconnection process.

Even more critical for the development of competition in the telecommunications market is the addition of a neutral provider of this important portion of the network. The lack of readily available, affordable, scaleable local network assets is one of the primary obstacles to enhanced competition between the LECs and other potential entrants into the telecommunications marketplace.

SUMMARY OF THE INVENTION

The above-mentioned needs in the art have been met by creating a neutral telecommunications network platform for providing tandem switching and transport services independent of the existing telephone network tandem infrastructure managed by the LECs. Those skilled in the art will appreciate that the techniques described herein permit the cost-effective creation of a hardwire platform of infrastructure and tandem switching capacity in many areas throughout the United States.

In particular, the present invention relates to a LEC bypass technology which provides a neutral tandem network ("NTN") by developing a series of reliable, centrally managed metropolitan voice interconnection gateways targeted at public and private wireline and wireless local and long distance carriers seeking to maximize the efficiency, performance, and reach of their networks. Carriers connecting to NTN telecommunications switching equipment will have their traffic routed to and from other carriers' networks in a manner that minimizes use of the LEC's metropolitan tandem switching network. This optimal routing of traffic among the multiplicity of networks that comprise the telecommunications spectrum today (e.g., wireless, CLECs, IXCs) will enable greater network efficiency and increased reliability while reducing traffic termination costs and competitive risks.

While the last 25 years have seen an explosive growth in the number of competing telecommunications networks and technologies, from scores of overlapping wireless carriers and dozens of competing local carriers to hundreds of long distance networks, one critical aspect of the nation's PSTN has remained unchanged: The RBOC tandem. The RBOC tandems, which were initially designed to serve as an aggregation point for transporting RBOC traffic into and out of a metropolitan region, have by default also become both (1) the point at which competitive carriers exchange traffic among themselves (i.e., transit traffic) as well as (2) the sole portal for terminating calls to the RBOC end offices, or central offices (i.e., terminating traffic) and for reaching advanced services, such as E911, directory assistance and operator services. As a result, there are major bottleneck (both physical and competitive) and economic concerns in the present RBOC PSTN tandem network. Most importantly, the RBOCs, which previously held a legal monopoly in the local communications market, view nearly every user of its tandem services as a competitor. As such, the RBOCs are reluctant to commit the necessary resources and support to grow traffic at the tandems and to adapt, design and build the traffic interfaces and access facilities to meet the escalating needs of its competitors.

The NTN of the invention will provide a superior quality of transit and terminating service versus the RBOC's legacy PSTN circuit switched tandem network by enabling carrier customers to pass traffic among themselves (utilizing advanced technology interfaces) and around the PSTN RBOC tandems. Above all, NTN will create a better metropolitan network for exchanging traffic among carriers because its overriding business purpose will be to facilitate the growth and development of its carrier customers within the region.

In a preferred embodiment, the NTN architecture will provide a reliable, scalable series of network access points by deploying an advanced tandem-level (Class 4) "soft switch" (as opposed to RBOC legacy circuit switch tandem technology) network architecture in each metropolitan market and establish multiple points of interconnection and switching throughout a metropolitan area. All of the NTN's telecommunications switching equipment will be located in central office grade buildings located in the serving metropolitan area, equipped with battery backup and emergency generators, dual power sources, clocking, heating, ventilation and air conditioning systems. Carriers in the region would connect into the network and be given access to the LEC's network via the LEC's switch, which would also be connected to the NTN. The NTN thus provides a higher level switching hierarchy above the current RBOC tandems.

BRIEF DESCRIPTION OF THE DRAWINGS

The advantages and beneficial features of the invention will be apparent from the following detailed description taken in conjunction with the accompanying drawings, of which.

DETAILED DESCRIPTION OF THE PRESENTLY PREFERRED EMBODIMENTS

Figure 1A:
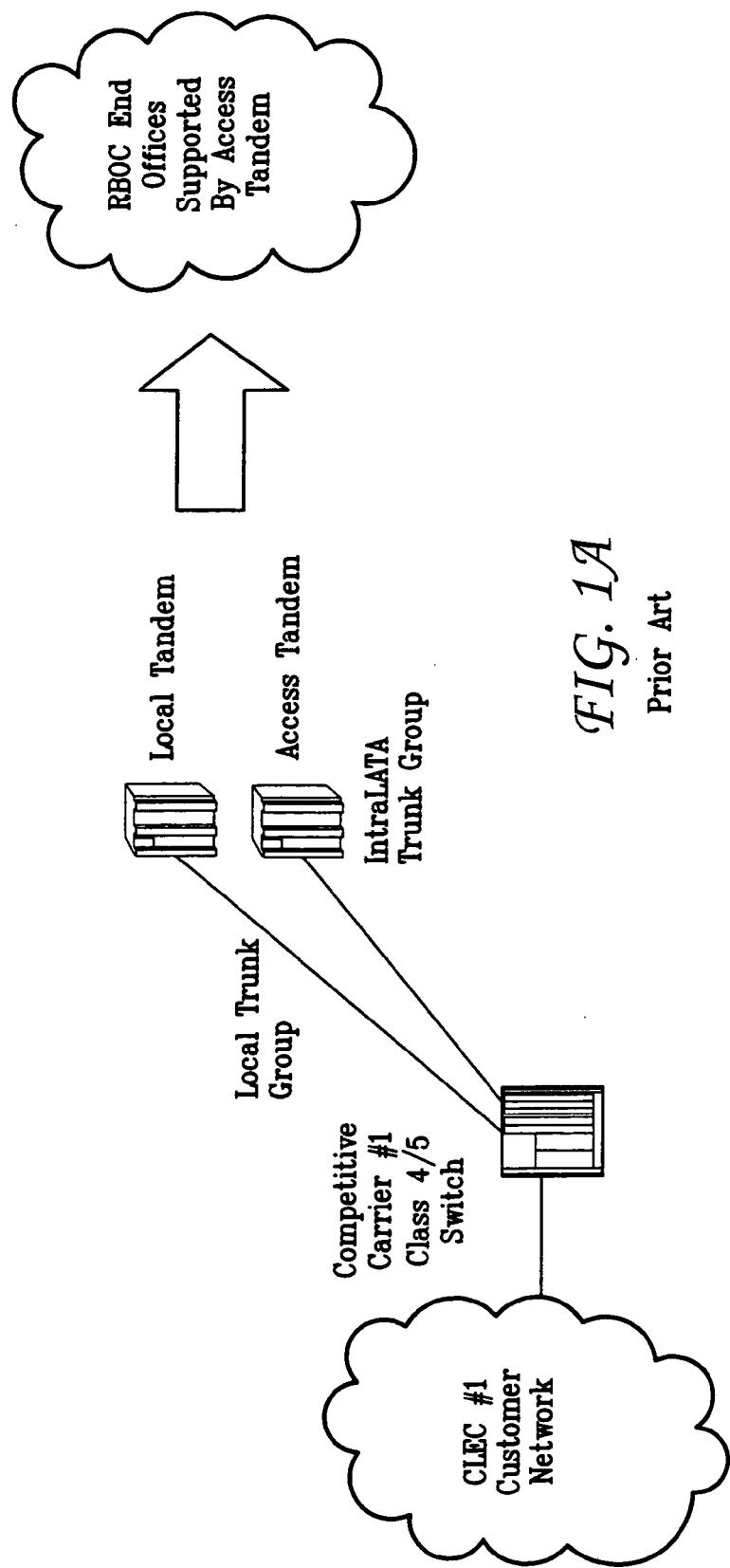
FIG. 1a illustrates conventional single, separate local and access tandems.
Figure 1B:
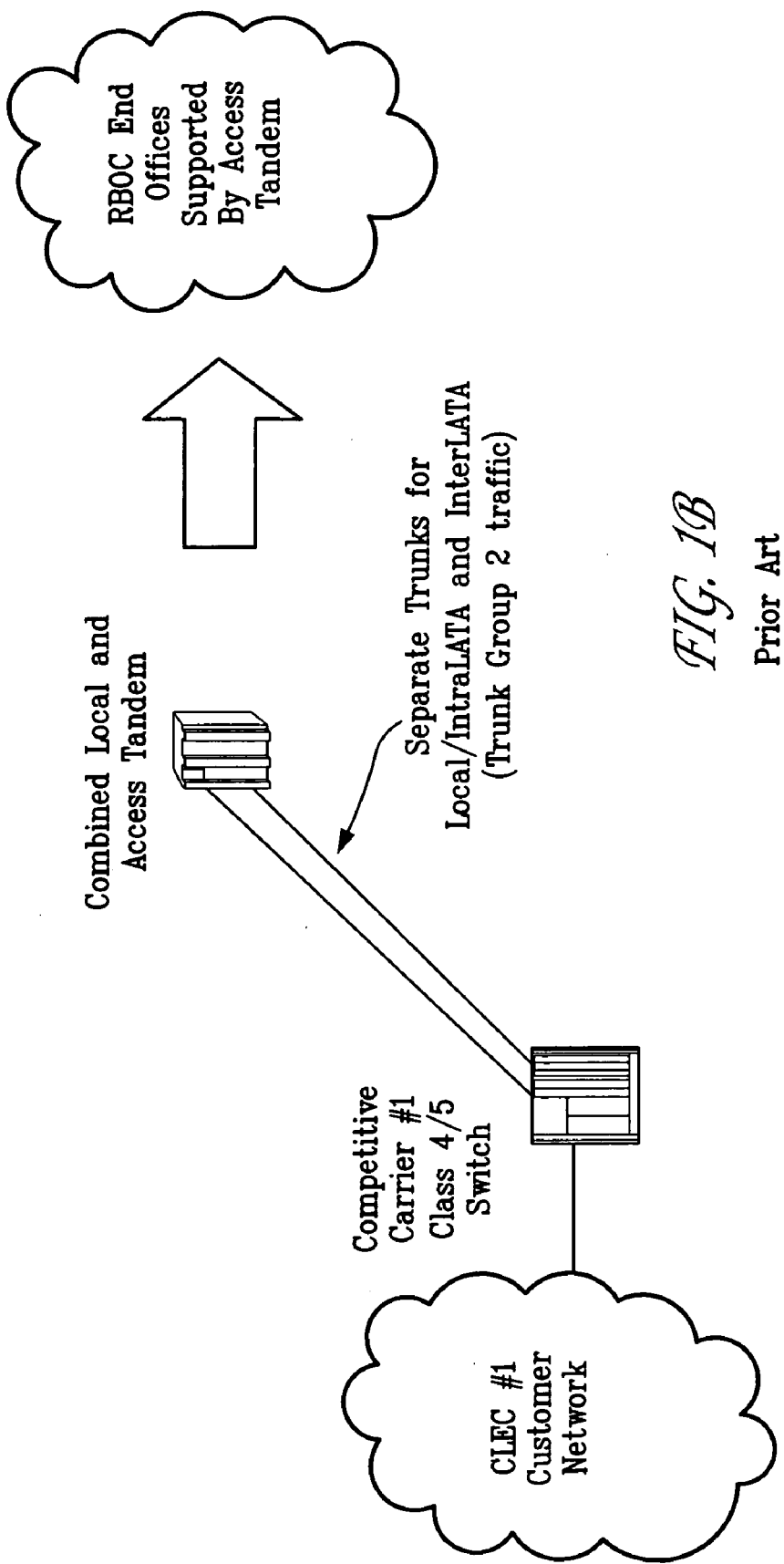
FIG. 1b illustrates conventional combined local and access tandems.
Figure 2:
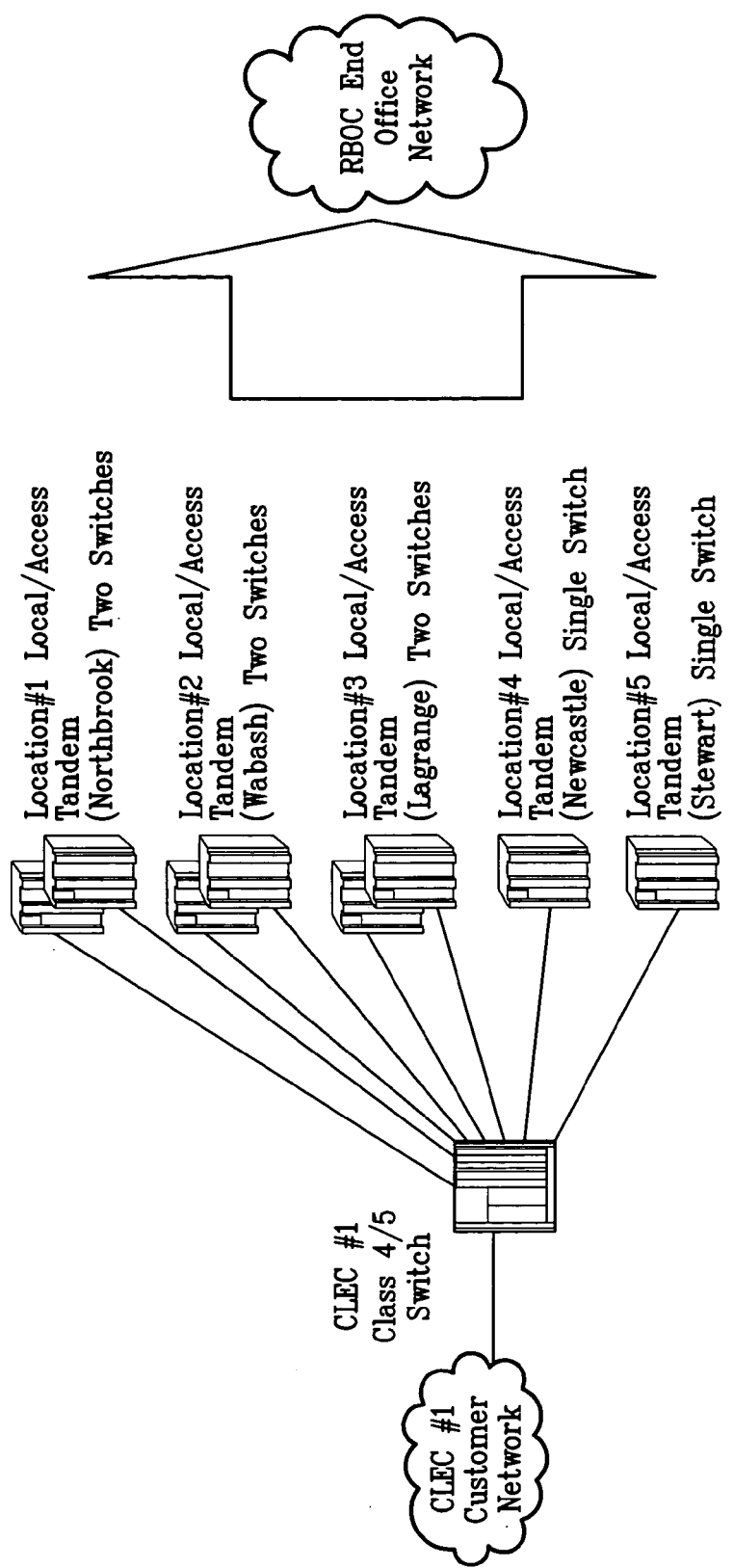
FIG. 2 illustrates conventional use of multiple tandems in a metropolitan area.
Figure 3:
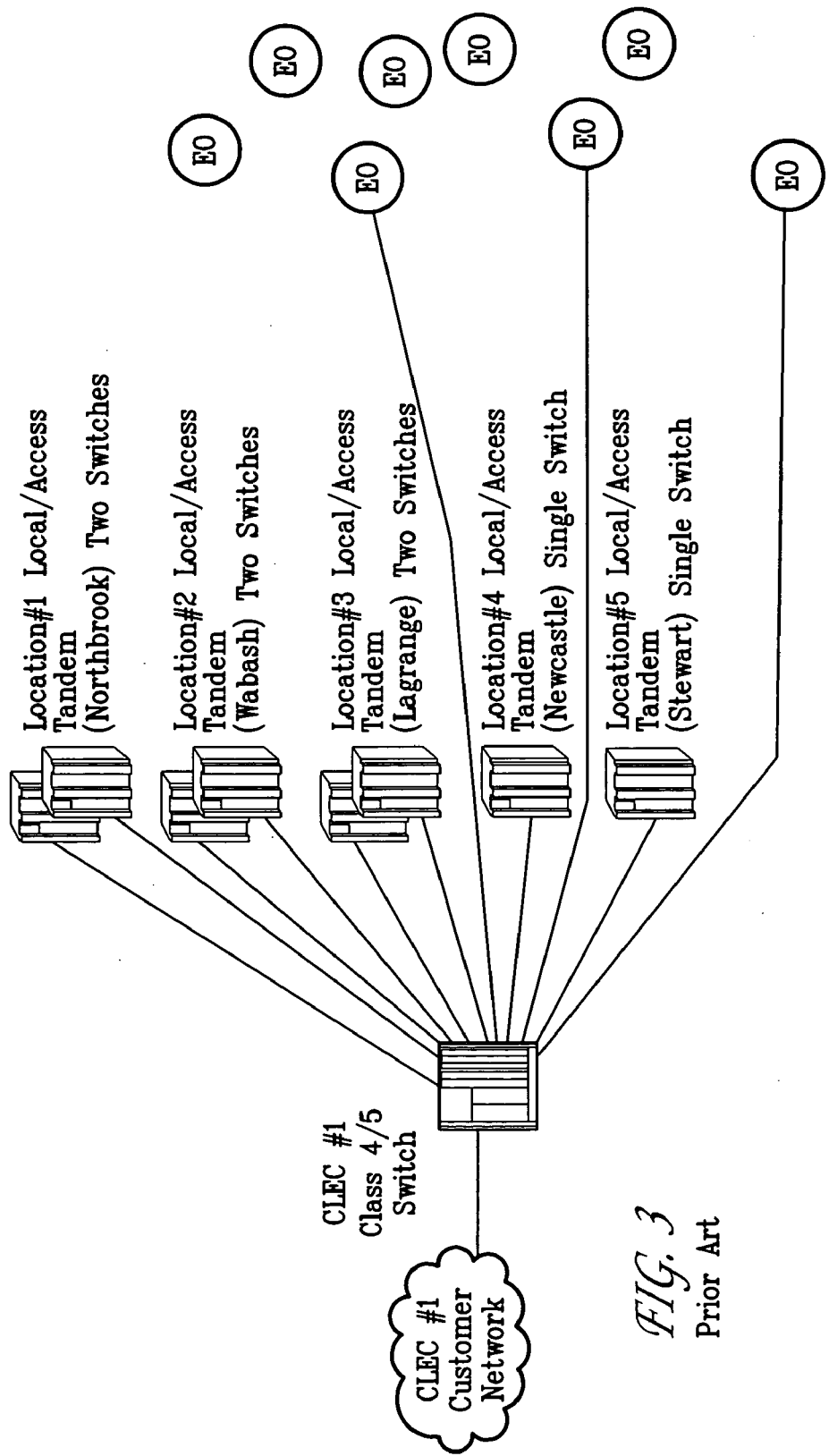
FIG. 3 illustrates the increased costs of conventional RBOC interconnection rules.
Figure 4:
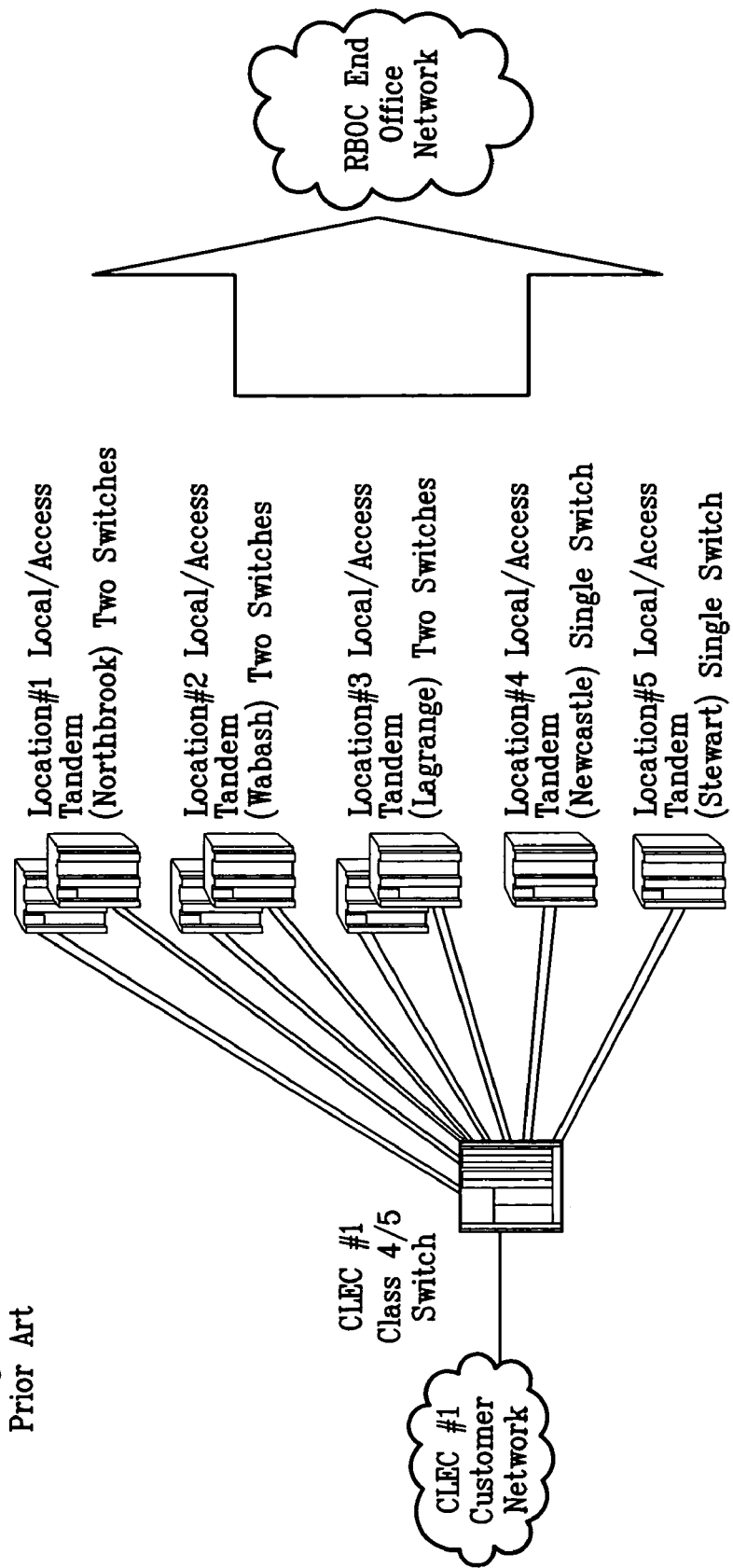
FIG. 4 illustrates a conventional interLATA (Meet Point) trunk group that satisfies the RBOC's requirement of a separate facility for traffic passing between a CLEC's customers and long distance carriers connected to the RBOC's tandem networks.
Figure 5:
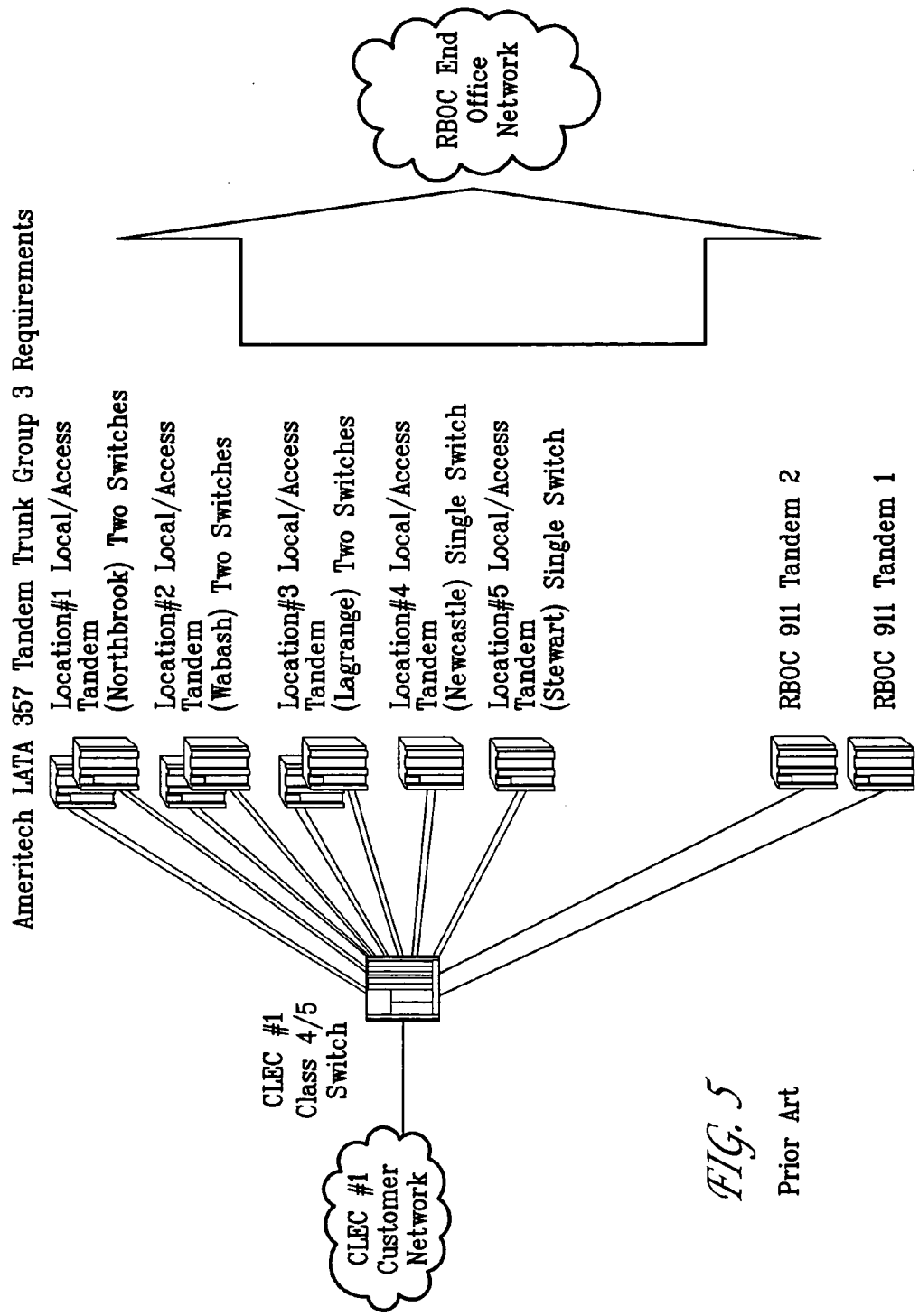
FIG. 5 illustrates a conventional E911 trunk group.
Figure 6:
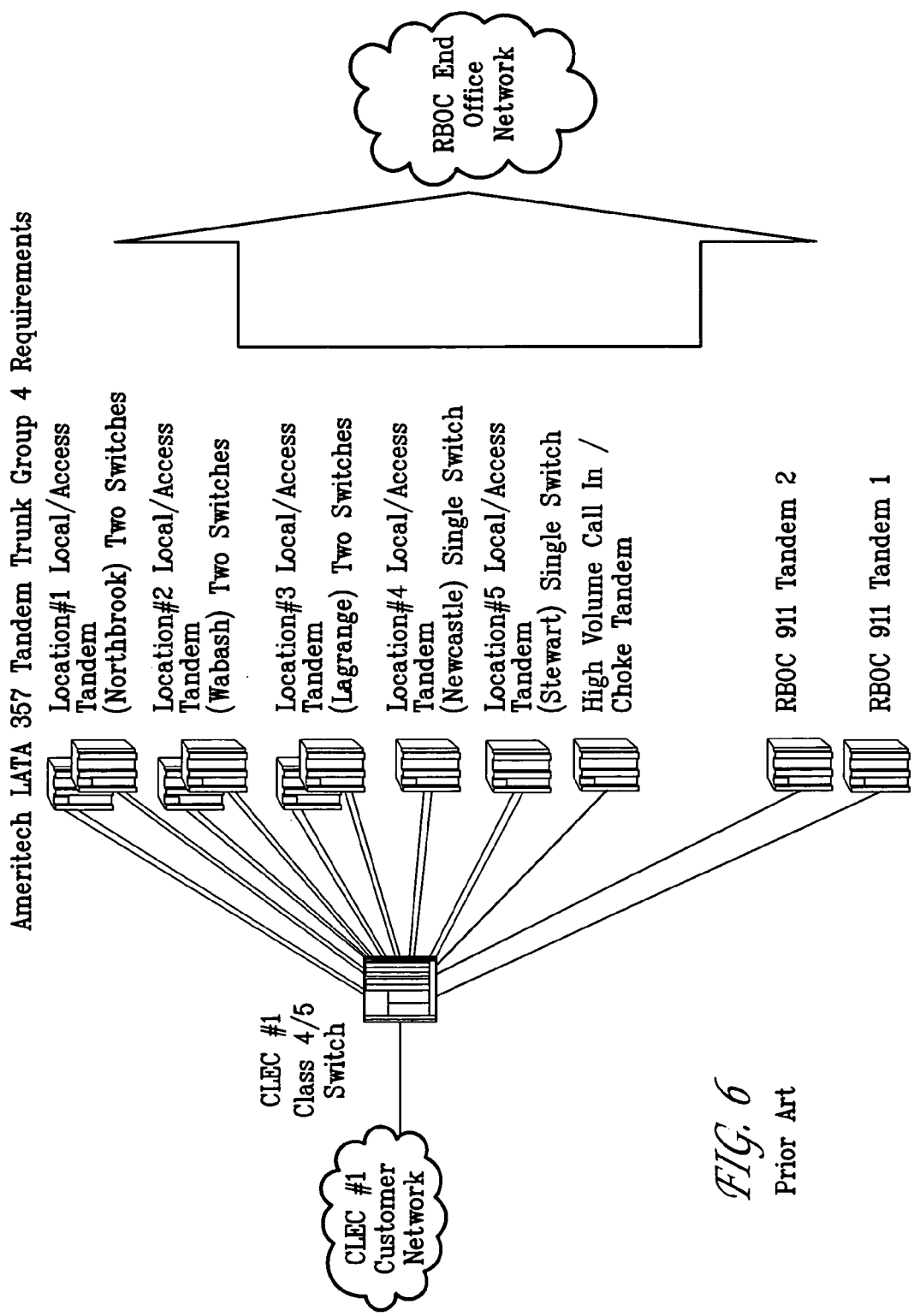
FIG. 6 illustrates a conventional high volume call in (HVCI)/mass calling (Choke) trunk group.
Figure 7:
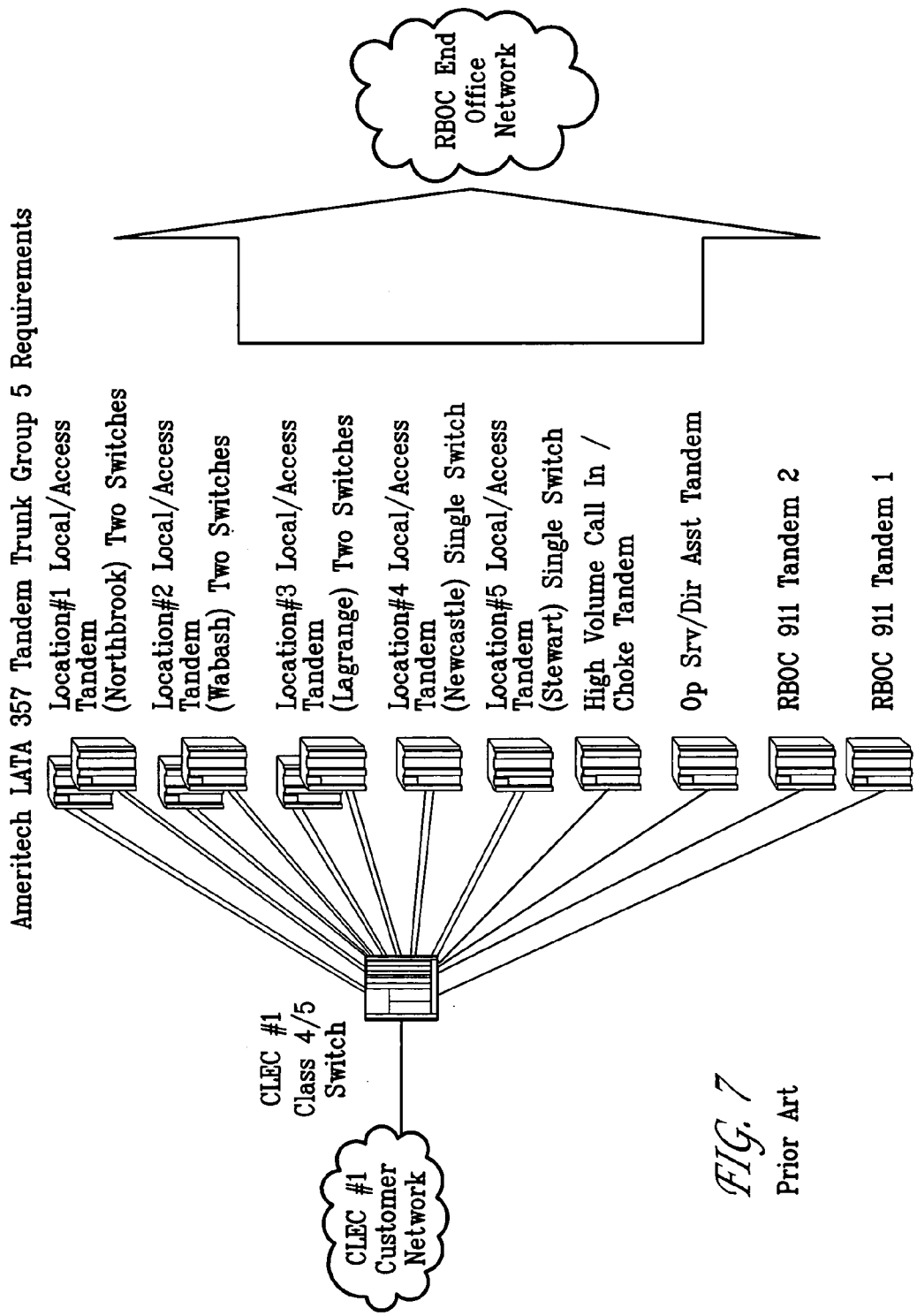
FIG. 7 illustrates a conventional Operator Services/Directory Assistance/Busy Line Verification/EI trunk group.
Figure 8:
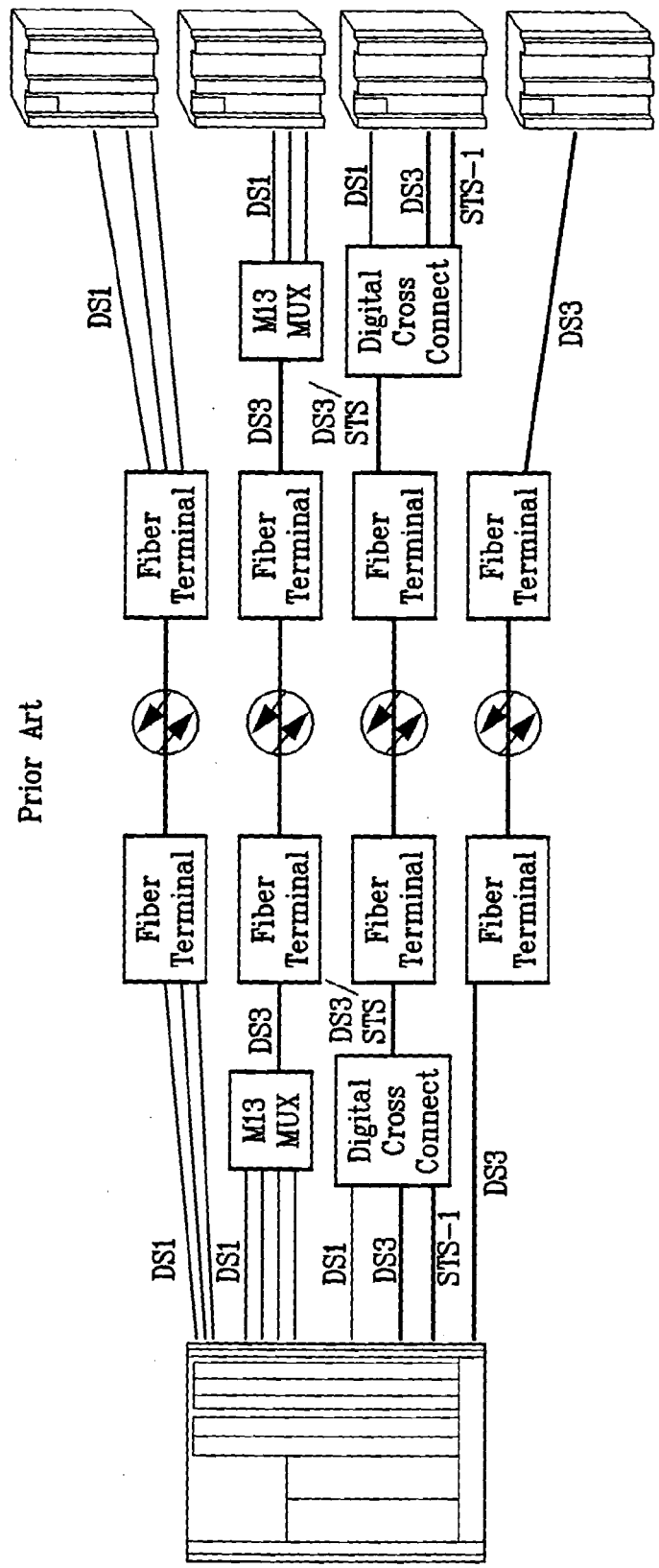
FIG. 8 illustrates the increased complexity and costs to CLECs with interconnection complexity.
Figure 9:
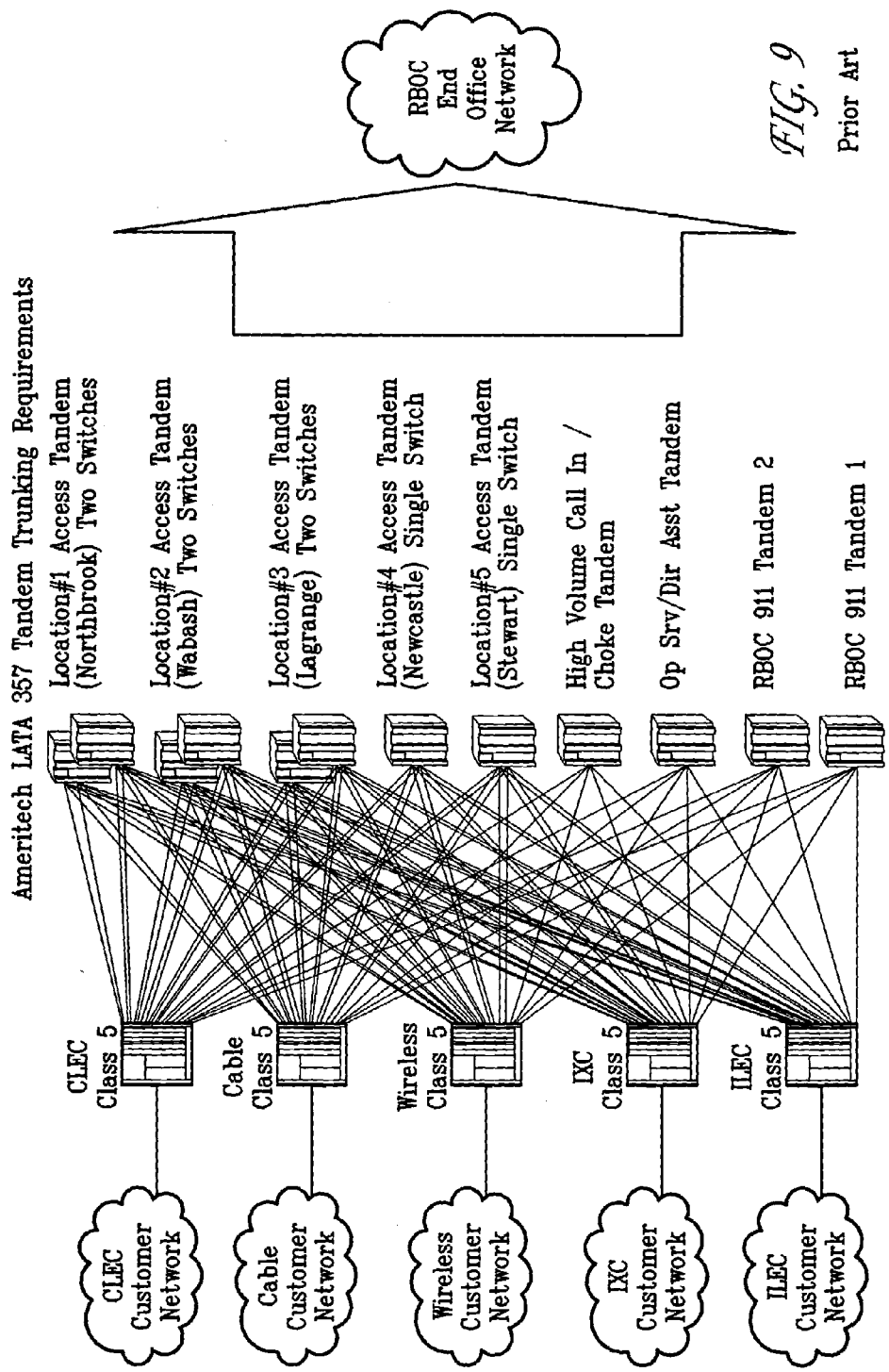
FIG. 9 illustrates that RBOC tandem interconnection trunking complexity increases exponentially in a region as both the type of public and private carrier networks increase (e.g., CLECs, wireless, cable television, long distance) and the absolute number of such carriers increase.
Figure 10:
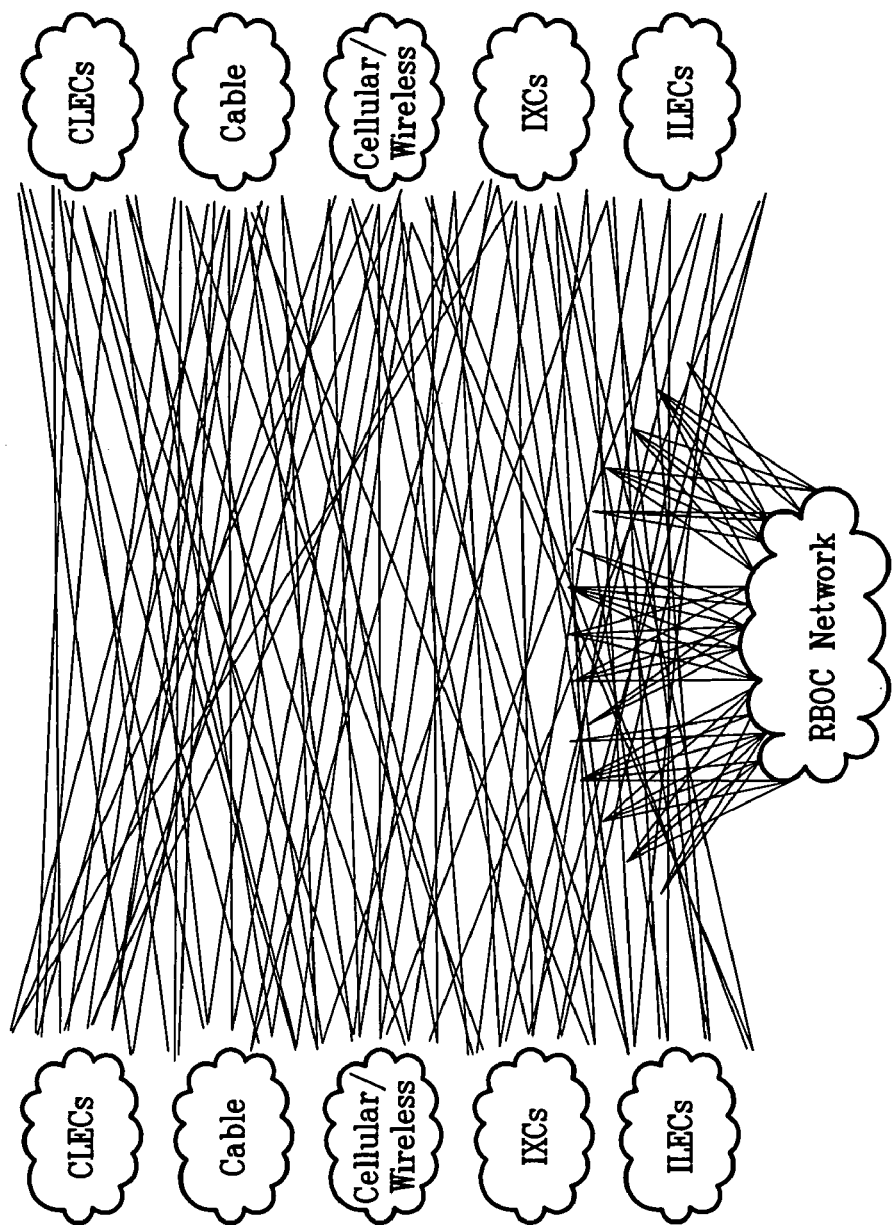
FIG. 10 illustrates that, without tandem switching, carriers would have to establish a mass of inefficient dedicated facilities.
Figure 11:
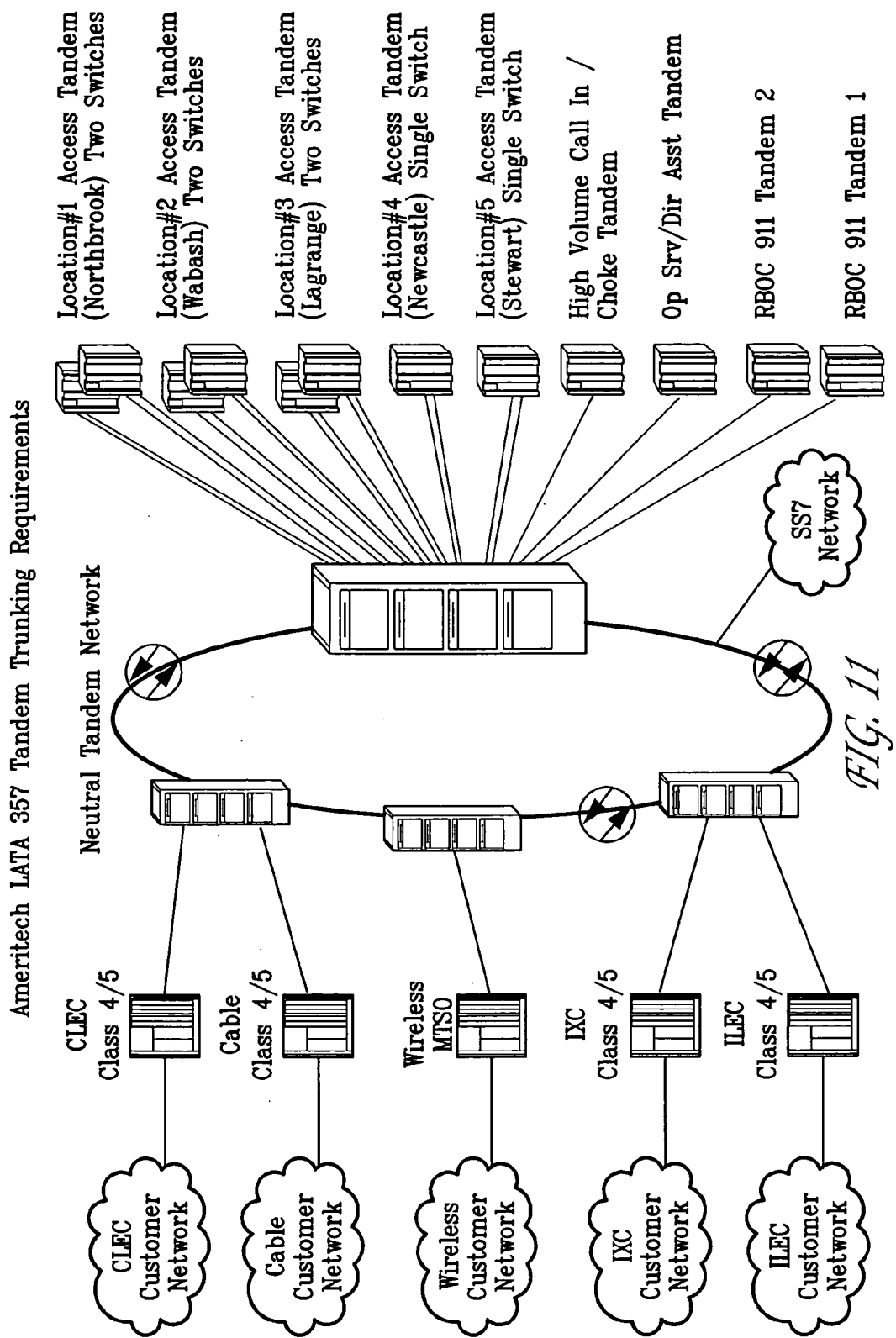
FIG. 11 illustrates a Neutral Tandem Network (NTN) in accordance with a preferred embodiment of the invention.

FIG. 11 illustrates a Neutral Tandem Network (NTN) 40 in accordance with a preferred embodiment of the invention. Preferably, the NTN architecture is engineered as a reliable, scalable series of network access points. The NTN 40 will deploy an advanced tandem-level (Class 4) "soft switch" (as opposed to RBOC legacy circuit switch tandem technology) network architecture in each metropolitan market and establish multiple points of interconnection 41 and switching throughout a metropolitan area. All of the NTN's telecommunications switching equipment 41, 42 will be located in central office grade buildings located in the serving metropolitan area, equipped with battery backup and emergency generators, dual power sources, clocking, heating, ventilation and air conditioning systems. Thus, the NTN 40 provides a Tandem access point 41 for all carriers in the region.

Carrier customers with network connection facilities located within the building housing the main NTN telecommunications switching equipment 42 for a metropolitan area may connect directly to NTN 40 using multiple network interfaces (e.g., T-1, DS3, STS-1, Optical, Gigabit/Fast Ethernet, ATM, TDM). The use of an advanced soft switch 42 allows a greater variety of network interfaces than RBOC circuit switches, including newer digital packet switching based connections. Customers with networks connections outside the NTN main telecommunications switching location may access the NTN 40 through remote NTN "on-ramps" or remote telecommunications switching equipment gateways 41 established at buildings in the metropolitan area. Such remote switches 41 may also be located inside RBOC end offices or tandems, depending on interconnection rules and regulations. Each gateway or remote module 41 on the NTN metropolitan network 40 will have switching intelligence, thus enabling local switching among carriers interconnected at the remote site without the need to transport or backhaul traffic to the main switching center to make such connections. Multiple switching modules and multiple connection points will provide back-ups in the case of failure of any single NTN telecommunications switching equipment or device 42. The NTN soft switch network architecture will be designed to grow as its carrier customers' traffic demands increase and as NTN adds new customers.

Unlike the RBOC tandem switch network, which requires dedicated connections to each tandem in a metropolitan region and often multiple connections to each of those tandems, the NTN 40 will allow carriers to access an entire metropolitan region through a single connection. Unlike the RBOC tandem switches, which require carriers to scale down their high capacity networks to the narrow bandwidth capacity compatible with the RBOC legacy circuit switches, the NTN swill further accommodate an entire spectrum of network interconnection specifications, from T-1 connections to fiber optic-feed OC-48 interfaces e.g., "Fat Pipes," as shown in FIG. 11.

A key enabling technology of the NTN of the invention is the soft switch platform 42. "Soft switch" is an all-encompassing term for a next-generation communications system that employs open standards to create integrated networks with a decoupled service intelligence capable of carrying voice, video, and data traffic more efficiently than possible with existing circuit switches. The separation of policy-based call control and services from the underlying transport network and hardware is the key defining element of soft switches. Traditionally, circuit switches have combined all the functions necessary to handle telephone calls—switching, call control, signaling, services, routing, and provisioning—together into a single, proprietary piece of equipment. As a result, the PSTN powered by circuit switches delivers a constrained set of services based on connections limited to 64 kbps and tied directly to the telephone switching hardware. The migration from circuit-switched networks to packet/frame/cell-switched networks controlled by soft switches will transition the industry from a closed environment to open standards-based systems. Soft switches 42 enable service consistency despite variations in the underlying media or transport networks or devices. Thus, decoupling the policy-based call routing allows carriers to both handle various network infrastructures (IP, ATM, TDM) on a call-by-call basis and to determine the best routing or path for such calls. Soft switches 42 therefore allow the NTN 40 to transport all types of traffic over a single core network and to interface with such networks at dramatically higher densities (T-1, T-3, OC-3, OC-12) than that available in the current tandem network.

Figure 12:
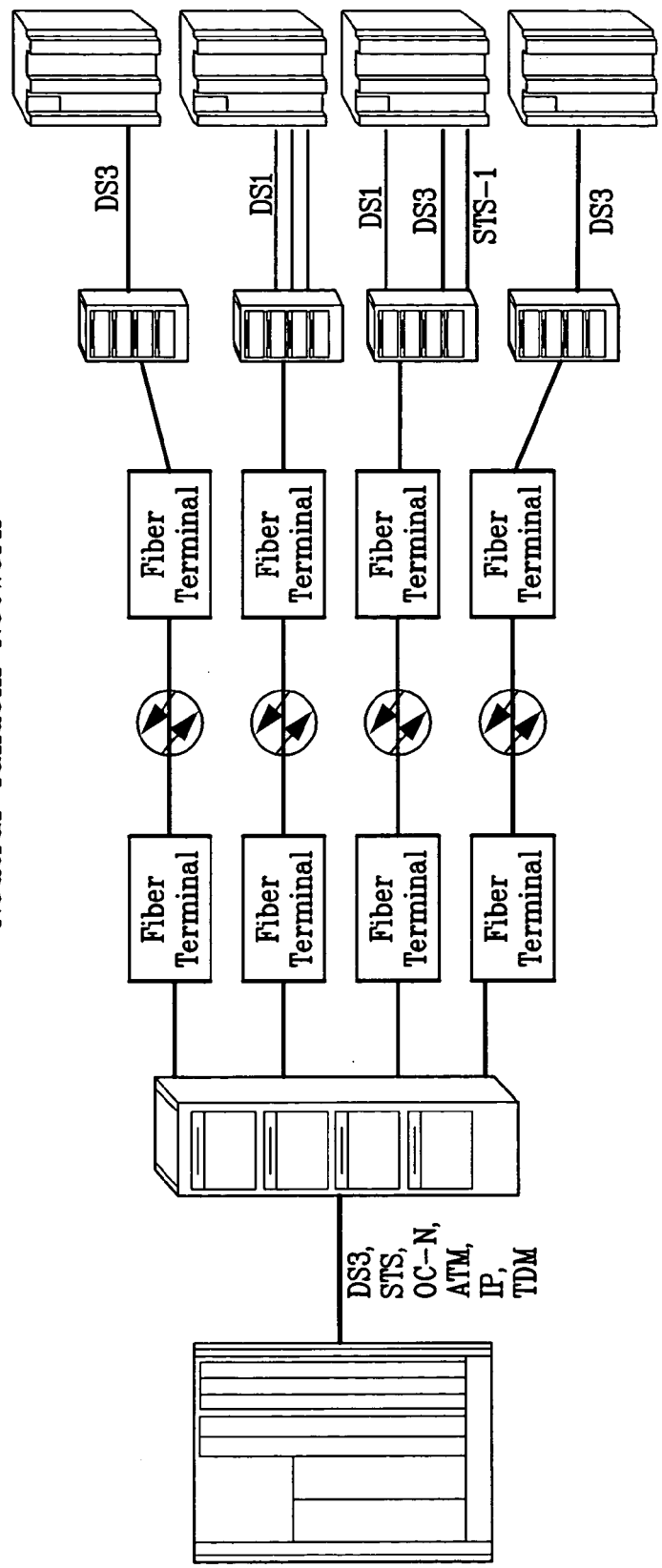
FIG. 12 illustrates an example of the Neutral Tandem switching gateway in accordance with the invention providing packet based or TDM higher density interfaces to competitive carriers and TDM interfaces of all types to the LEC Tandem Network.

FIG. 12 illustrates an example of the Neutral Tandem switching gateway 44 in accordance with the invention providing packet based or TDM higher density interfaces to competitive carriers and TDM interfaces of all types to the LEC Tandem Network.

As a result of the separation of call control and hardware, soft switches 42 also yield per port cost savings of 50% versus circuit switches and lower provisioning and maintenance costs. The per port cost savings should increase as a result of the soft switch's leveraging of what has become known as Moor's Law. It is expected that the performance of data components (at the same cost), which make up the bulk of the soft switch infrastructure, is doubling every 18 months, while the performance of voice components is doubling every 10 years. In addition, packet based infrastructure takes up much less physical space than traditional circuit switches. For example, while it takes 40 bays of equipment to handle 50,000 circuit-based calls, it takes only two 19" racks to hold the equivalent soft switch infrastructure handling the same number of calls.

The soft switch 42 is therefore a software system that manages network devices to set up calls across IP, ATM, and circuit networks. The soft switch 42 maintains network policy information on services, routing, and provisioning, and applies these policies to determine how calls should be handled.

Because of their software design, soft switches 42 can utilize a wide range of standard hardware platforms to fit any size network. It may be replicated as required for high availability or to support very high call processing requirements. In case of a failure of the primary soft switch 42, the system can be designed to transparently transfer control to another soft switch 42 without any impact on calls. The software-driven platform also allows essentially unlimited scalability and call-processing capability, unlike circuit switches that are constrained from unlimited scaling by hardware-related bottleneck networks. Finally, the software foundation of the soft switch 42 allows services and applications to be built using open APIs on standards-based platforms and developed on commercially available tools. Published APIs use existing standards, opening the carrier services market to a new segment of developers who can—for the first time—build new caller services based on IP servers.

Figure 13:
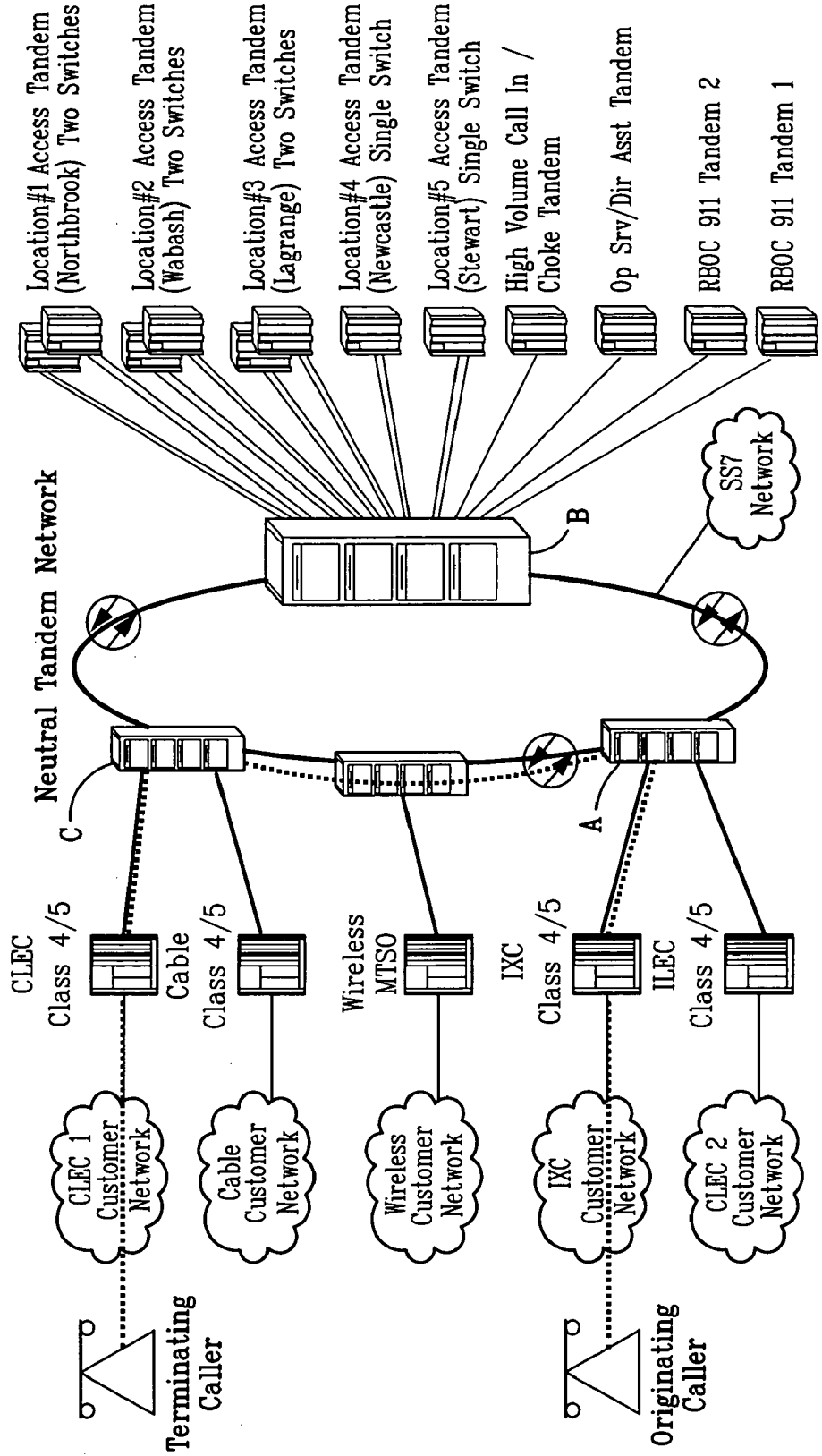
FIG. 13 illustrates soft switch call processing whereby a call arrives over an NTN-connected carrier's transport to the NTN node or gateway.

FIG. 13 illustrates soft switch call processing. As illustrated, a call arrives over an NTN-connected carrier's transport to the NTN node or gateway 41 (point "A" on FIG. 13). The gateway 41 notifies the soft switch 42 (point "B" on FIG. 13), proving the available information about the call: calling number, number called, carrier, trunk group. The soft switch 42 analyzes the call information according to NTN-defined service selection rules. The rules define the order in which the soft switch 42 analyzes call attributes to determine provisioned services. For example, a particular called number may be associated with an end office in which the NTN 40 has diverse routing options, The soft switch 42 would analyze the options and determine the optimal route—e.g., confirming that one path is utilized and thus choosing an alternative path (point "C" on FIG. 13). The soft switch 42 handles each provisioned service in turn, either performing itself or instructing the gateway 41 to perform the service.

Sample call placement using the NTN 40 of the invention will be described below with respect to FIGS. 13–18.

As also shown in FIG. 13, for transit call routing over the NTN 40, a customer of an NTN-connected long distance carrier goes off-hook at their premises 46, dials a long distance call—e.g., 1+area code+terminating telephone number. The call is routed by the serving local exchange carrier to the calling party's preferred long distance carrier's Point of Presence ("POP") 48. At the POP, the long distance carrier's switch 14 read's the area code and first three digits of the terminating telephone number to determine the metropolitan area and tandem switch associated with the terminating telephone number and routes the call through its long distance network 48 to the terminating POP serving that metropolitan area. Because the long distance carrier has connected the terminating POP to the NTN 40 for that metropolitan area, the call is routed to the NTN 40 for termination over the transport facility 49 between the long distance carrier and the NTN 40. The call is received at the NTN 40 with the terminating area code and telephone number. The NTN switch 42 looks up the terminating telephone number using its SS-7 database link 50 to determine the local carrier for terminating the call. Upon looking up the telephone number, the NTN 40 determines that the terminating local carrier (e.g., CLEC) is also connected to the NTN 40, and the NTN switch 42 routes the call over the transport 52 connecting the CLEC to the NTN 40. The call then proceeds over the CLEC's network 54 to its Class 5 switch 14, which translates the terminating telephone number into a local loop terminating at the called party's premise 56.

Figure 14:
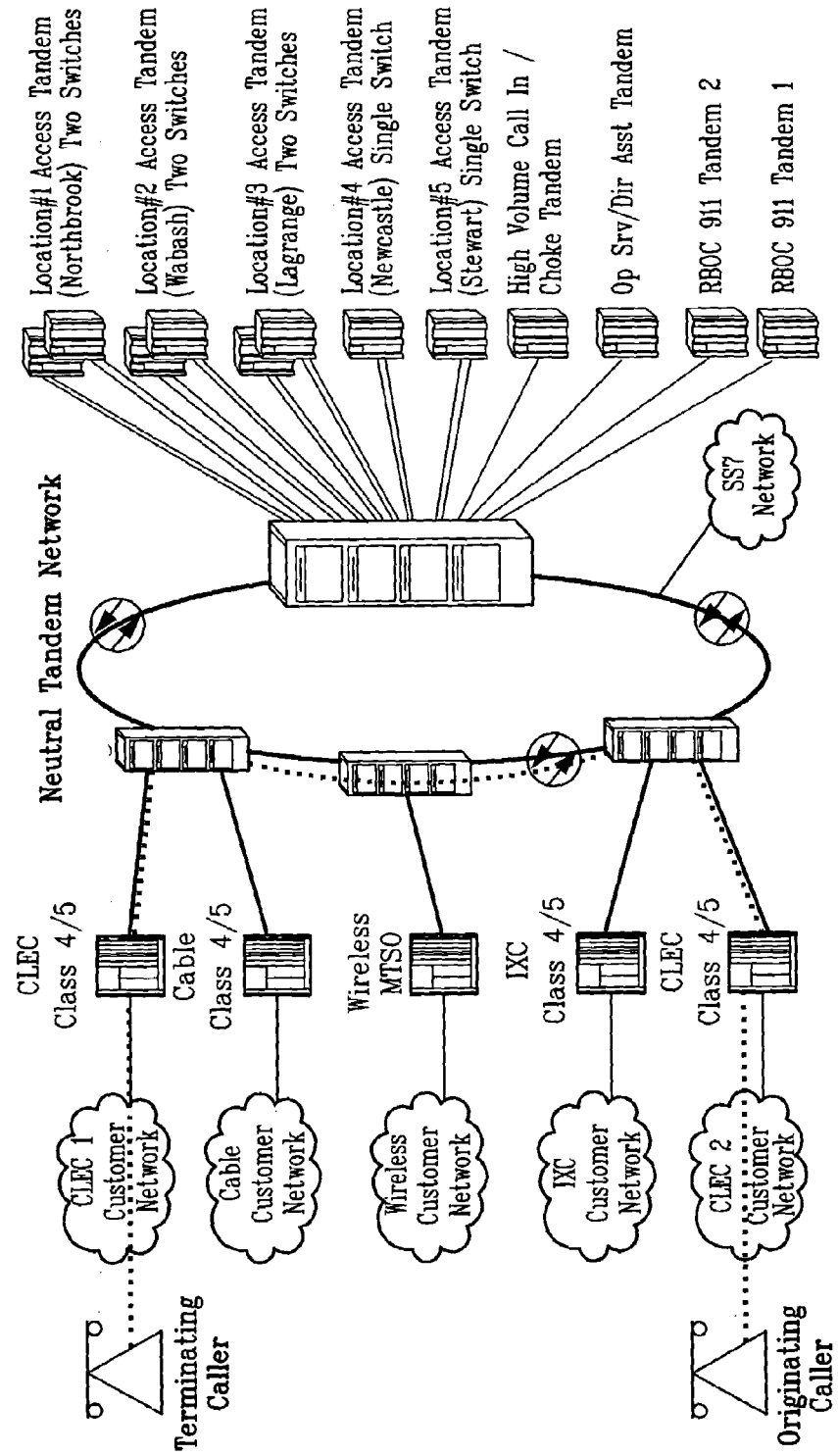
FIG. 14 illustrates a local call between customers of two NTN-connected CLECs using the NTN of the invention.

FIG. 14 illustrates a local call between customers of two NTN-connected CLECs. As illustrated, a customer of an NTN-connected CLEC 2(58) goes off-hook at their premises 60 and dials a local call—e.g., seven-digit terminating telephone number. The calling party's CLEC 2 switch 14 reads the terminating telephone number to determine that it is a local area call and looks up the terminating telephone number using its SS-7 database link 50 to determine the local carrier for the terminating the call and routing path for terminating the call. Upon looking up the telephone number, the CLEC 2 determines that the terminating local carrier (e.g., CLEC 1) is also connected to the NTN 40. The call is then routed over the hardwire connection between CLEC 2 and the NTN switch 42. The NTN switch 42 receives from CLEC 2 the call routing information and sends the call on to CLEC 1 over the hardwire connection 52 between NTN 40 and CLEC 1. CLEC 1's switch 14 reads the traffic routing information and the called party's telephone number and opens up the circuit to transmit the call to the called party 56 via CLEC network 54.

Figure 15:
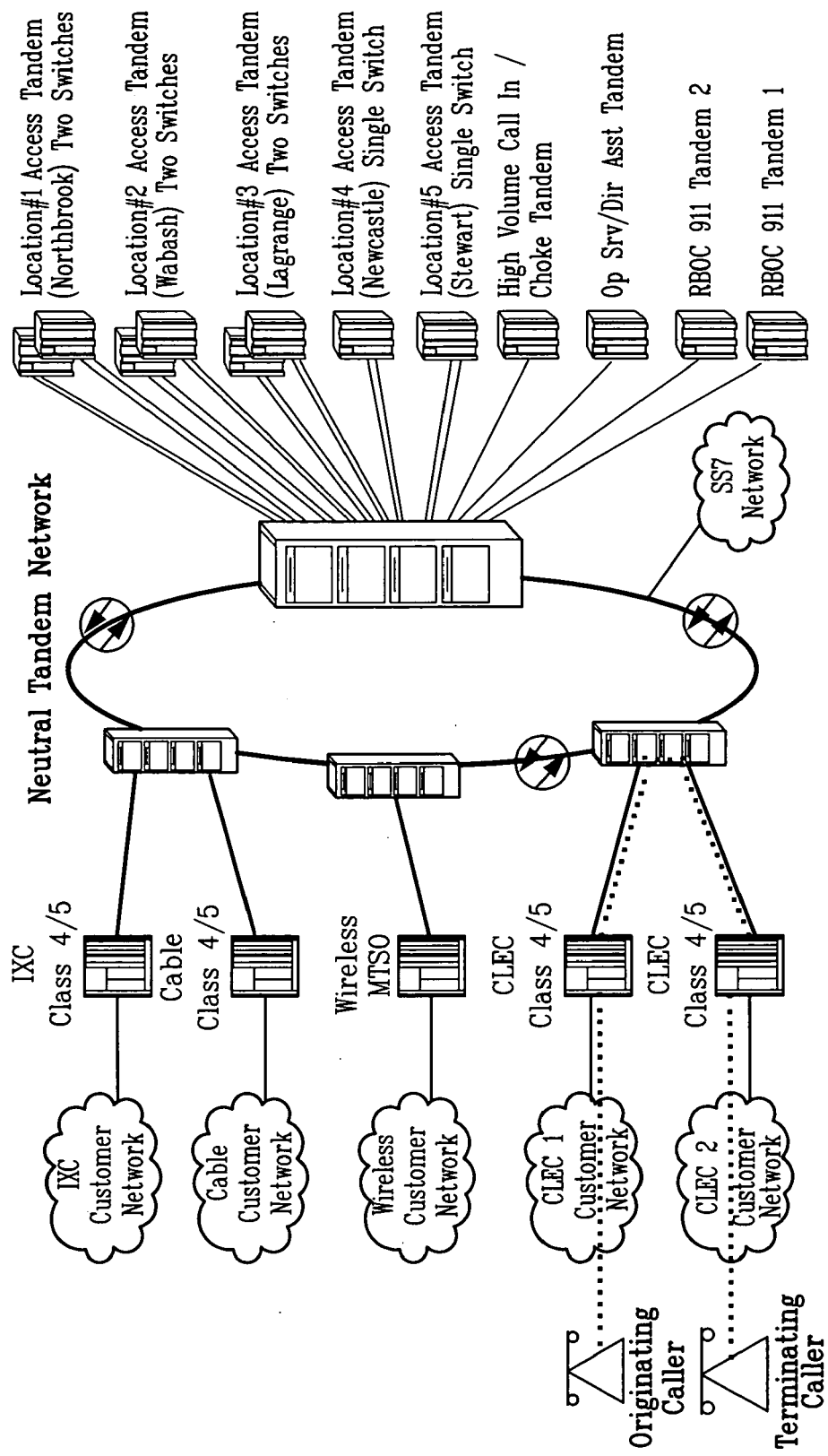
FIG. 15 illustrates a local call between customers of two CLECs connected at the same remote switching node on the NTN of the invention.

FIG. 15 illustrates a local call between customers of two CLECs connected at the same remote switching node 41 on the NTN 40. As illustrated, a customer of an NTN-connected CLEC 1 goes off-hook at their premises 62 and dials a local call—e.g., seven-digit terminating telephone number. The calling party's CLEC 1 switch 14 reads the terminating telephone number to determine that it is a local area call and looks up the terminating telephone number using its SS-7 database link 50 to determine the local carrier for the terminating the call and routing path for terminating the call. Upon looking up the telephone number, the CLEC 1 determines that the terminating local carrier (e.g., CLEC 2) is also connected to the NTN 40. The call is then routed over the hardwire connection between CLEC 1 and the remote NTN switch 41. The remote NTN switch 41 receives from CLEC 1 the call routing information, determines that CLEC 2 is also connected to the remote switch and sends the call on to CLEC 2 over the hardwire connection 64 between the remote NTN switch 41 and CLEC 2. CLEC 2's switch 14 reads the traffic routing information and the called party's telephone number and opens up the circuit to transmit the call to the called party 66.

Figure 16:
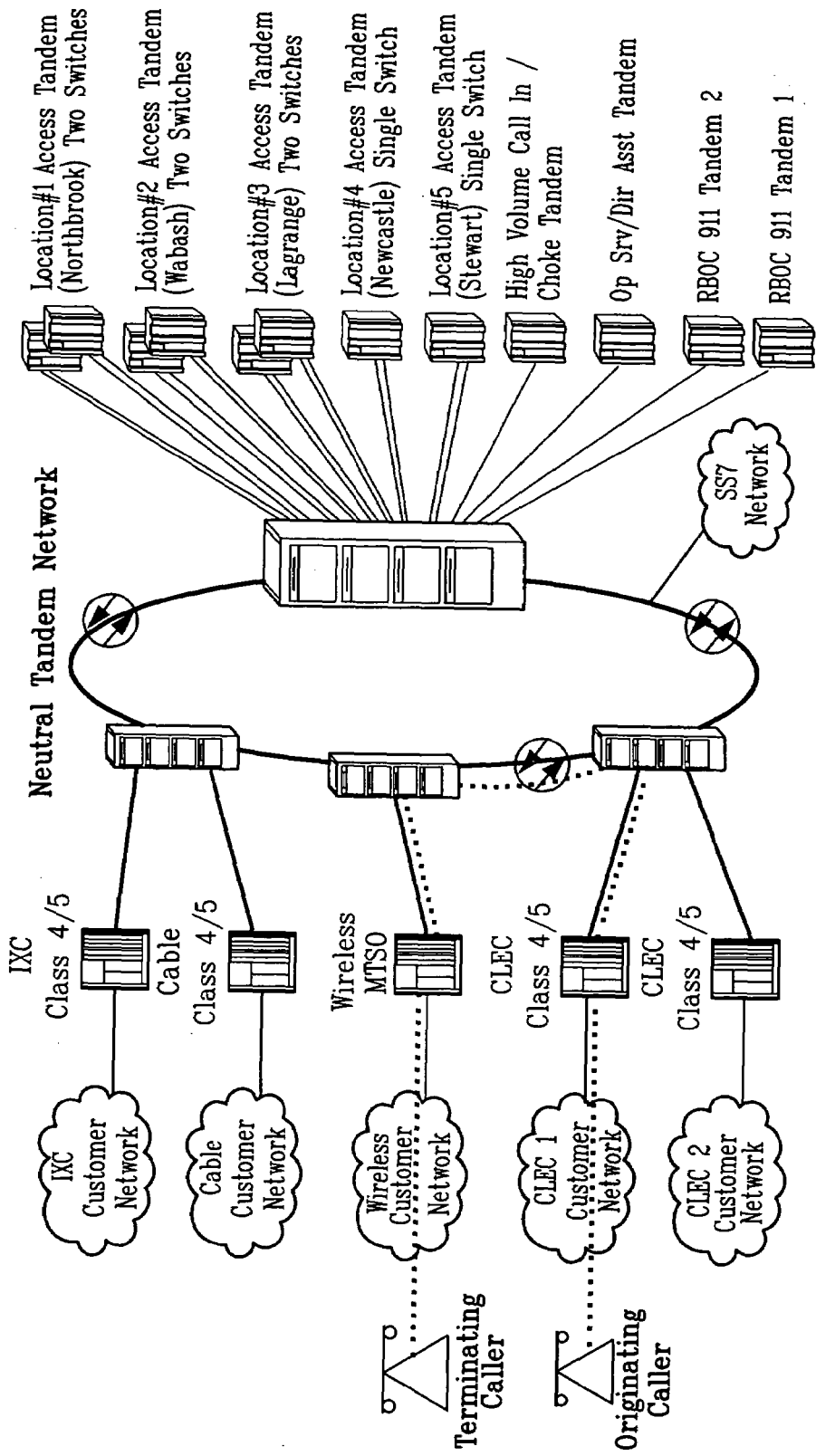
FIG. 16 illustrates a local call between customers of an NTN-connected CLEC and an NTN-connected wireless carrier using the NTN of the invention.

FIG. 16 illustrates a local call between customers of an NTN-connected CLEC and an NTN-connected wireless carrier. As illustrated, a customer of an NTN-connected CLEC goes off-hook at their premises 68 and dials a local call—e.g., seven-digit terminating telephone number. The calling party's CLEC switch 14 reads the terminating telephone number to determine that it is a local area call and looks up the terminating telephone number using its SS-7 database link 50 to determine the carrier for the terminating the call and routing path for terminating the call. Upon looking up the telephone number, the CLEC determines that the terminating carrier is a wireless carrier also connected to the NTN 40. The call is then routed over the hardwire connection 52 between the CLEC and the NTN switch 41. The NTN switch 41 receives from the CLEC the call routing information and sends the call on to the wireless carrier 72 over the hardwire connection 70 between NTN 40 and the wireless carrier 72. The wireless carrier's Mobile Telephone Switching Office ("MTSO") 74 reads the traffic routing information and the called party's telephone number and sets up the call for transmission to the called party 76 via wireless customer network 74.

Figure 17:
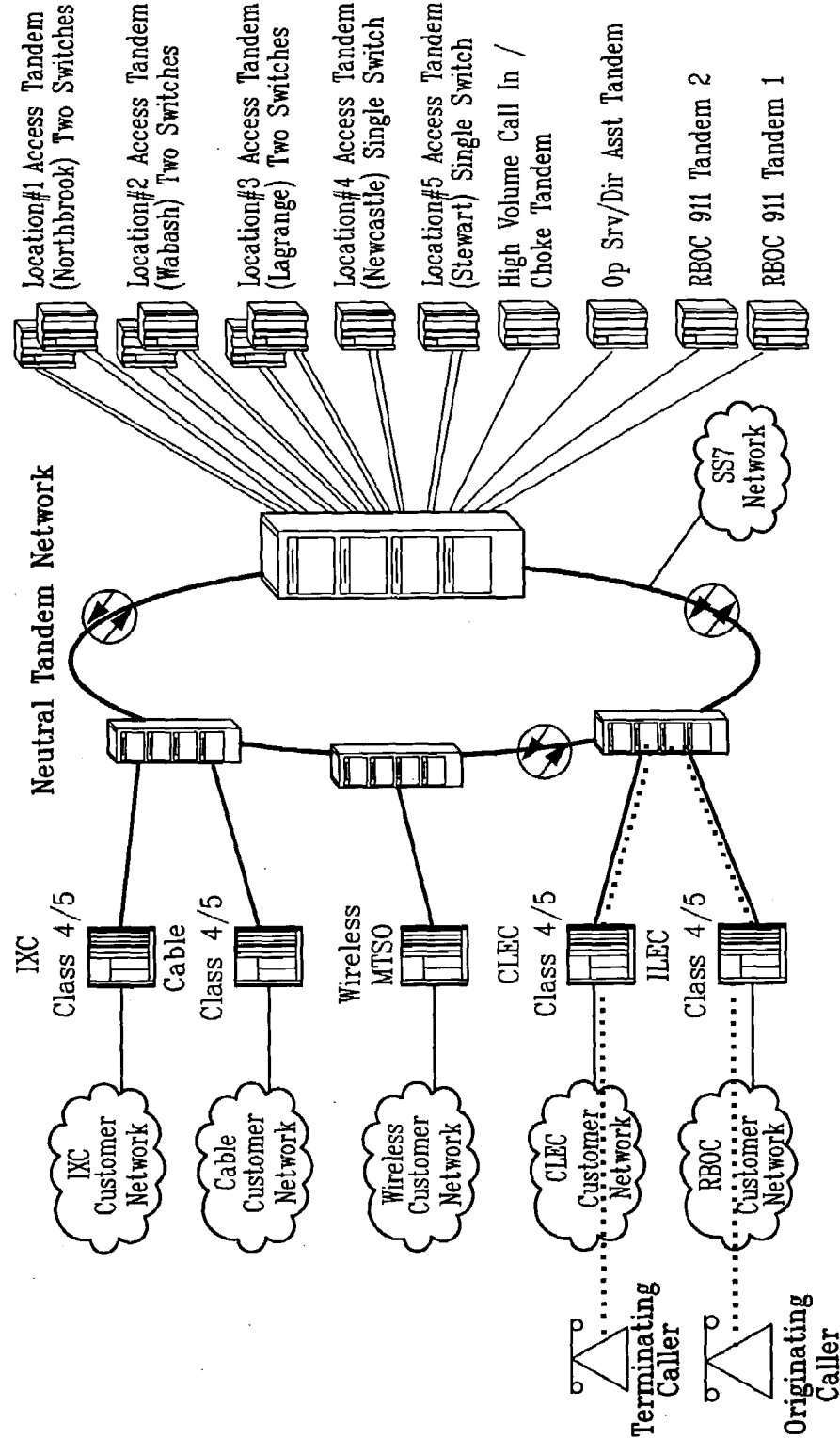
FIG. 17 illustrates a local call between customers of an NTN-connected RBOC and an NTN-connected CLEC using the NTN of the invention.

FIG. 17 illustrates a local call between customers of an NTN-connected RBOC 78 and an NTN-connected CLEC 54. For trunking efficiencies, an RBOC 78 may choose to utilize the NTN 40 to transmit traffic terminating to carrier networks connected to the NTN 40. As illustrated, a customer 80 of an NTN-connected RBOC 78 goes off-hook at their premises and dials a local call—e.g., seven-digit terminating telephone number. The calling party's RBOC local switch 14 reads the terminating telephone number to determine that it is a local area call and looks up the terminating telephone number using its SS-7 database link 50 to determine the local carrier for the terminating the call and routing path for terminating the call. Upon looking up the telephone number, the RBOC 78 determines that the terminating local carrier (e.g., CLEC) is also connected to the NTN 40. The call is then routed over the hardwire connection 82 between the RBOC and the NTN switch 41. The NTN switch 41 receives from the RBOC 78 the call routing information and sends the call on to the terminating CLEC 54 over the hardwire connection 52 between NTN 40 and the CLEC 54. The CLEC's switch 14 reads the traffic routing information and the called party's telephone number and opens up the circuit to transmit the call to the called party 84.

Figure 18:
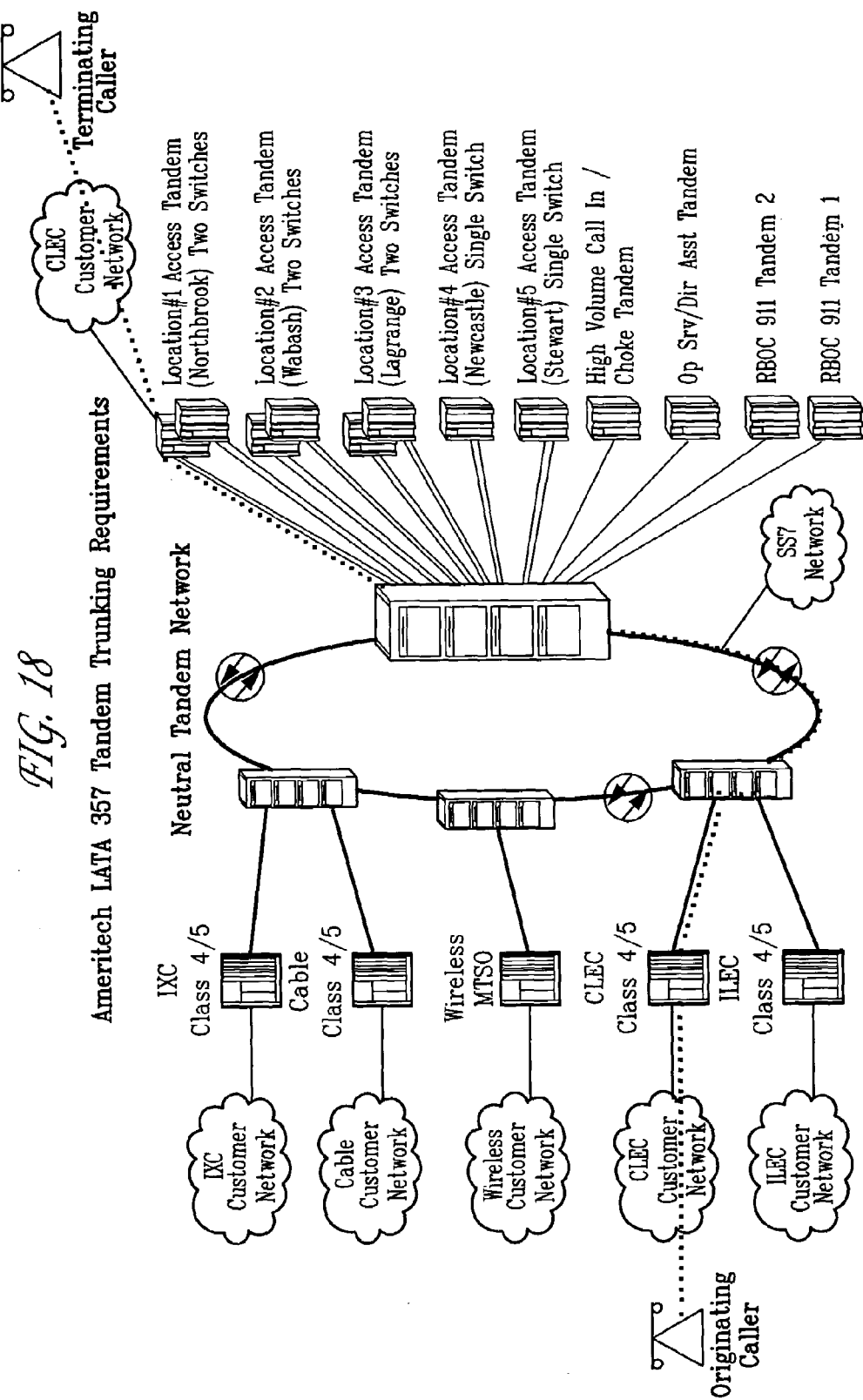
FIG. 18 illustrates a local call between customers of an NTN-connected CLEC and a CLEC that is not connected to the NTN of the invention.

FIG. 18 illustrates a local call between customers of an NTN-connected CLEC 54 and a CLEC 86 that is not connected to the NTN 40. For trunking efficiency or overflow purposes, an NTN-connected CLEC 54 may choose to route transiting traffic over NTN 40 to a CLEC 86 not hardwired connected to NTN 40. As illustrated, a customer of an NTN-connected CLEC 1 (54) goes off-hook at their premises 88 and dials a local call e.g., seven-digit terminating telephone number. The calling party's CLEC 1 switch 14 reads the terminating telephone number to determine that it is a local area call and looks up the terminating telephone number using its SS-7 database link 50 to determine the local carrier for the terminating the call and routing path for terminating the call. Upon looking up the telephone number, the CLEC 1 determines that the terminating local carrier is connected to an RBOC tandem connected to the NTN 40. The call is then routed over the hardwire connection between CLEC 1 (52) and the remote NTN switch 41. The remote NTN switch 41 receives from CLEC 1 the call routing information, determines that CLEC 2 is accessible through an RBOC tandem connected to the NTN 40 and sends the call on to the CLEC 21 over the hardwire connection 90 between the NTN 40 and the terminating RBOC tandem 18. The RBOC tandem receives the routing information and sets up a connection 92 over local access Trunk Group established by the CLEC 86. CLEC 86's switch receives and translates the traffic routing information and the called party's telephone number and opens up the circuit to transmit the call to the called party 94.

Figure 19:
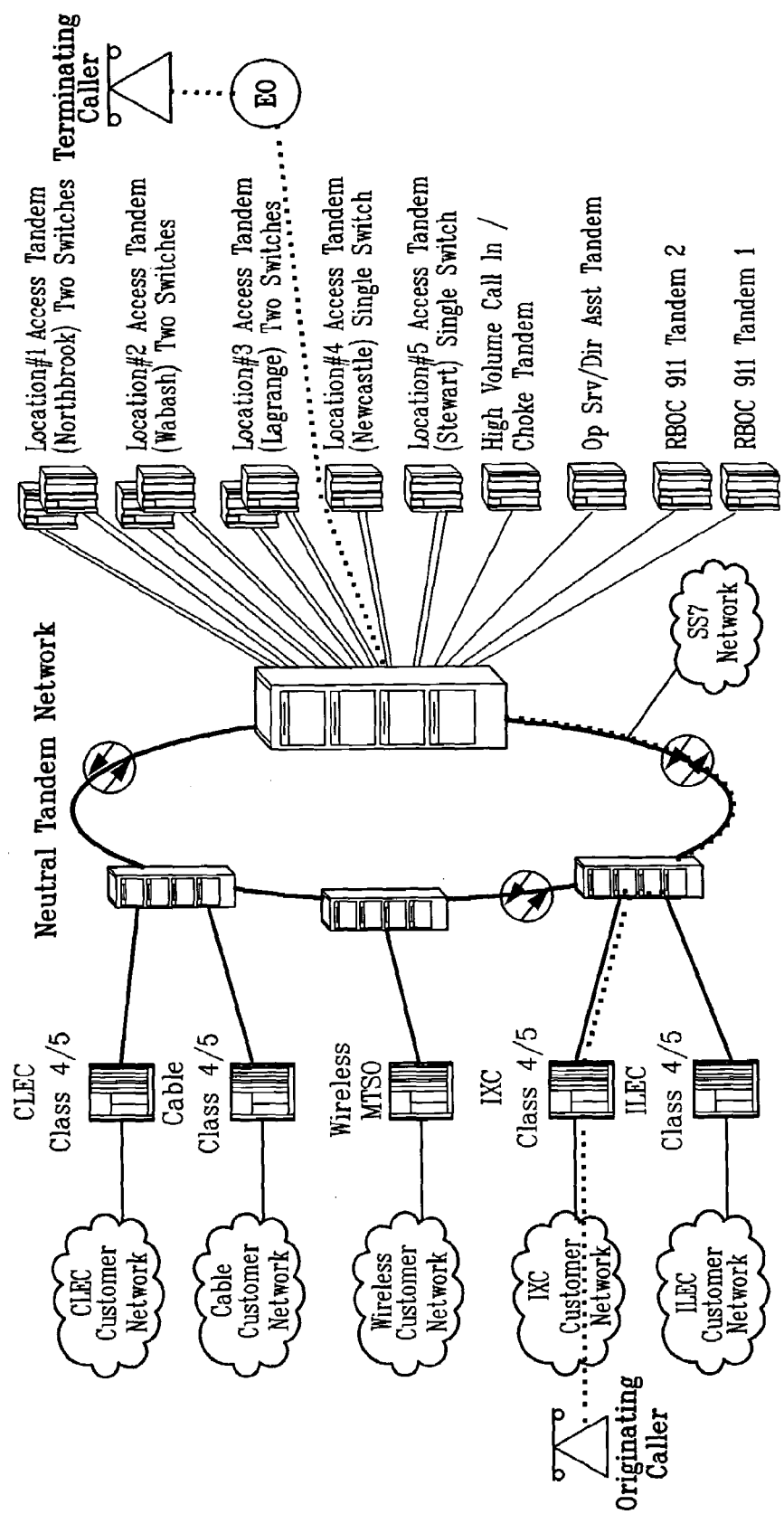
FIG. 19 illustrates a long distance call from a customer of an NTN-connected long distance carrier and an RBOC local service customer using the NTN of the invention.
Figure 20:
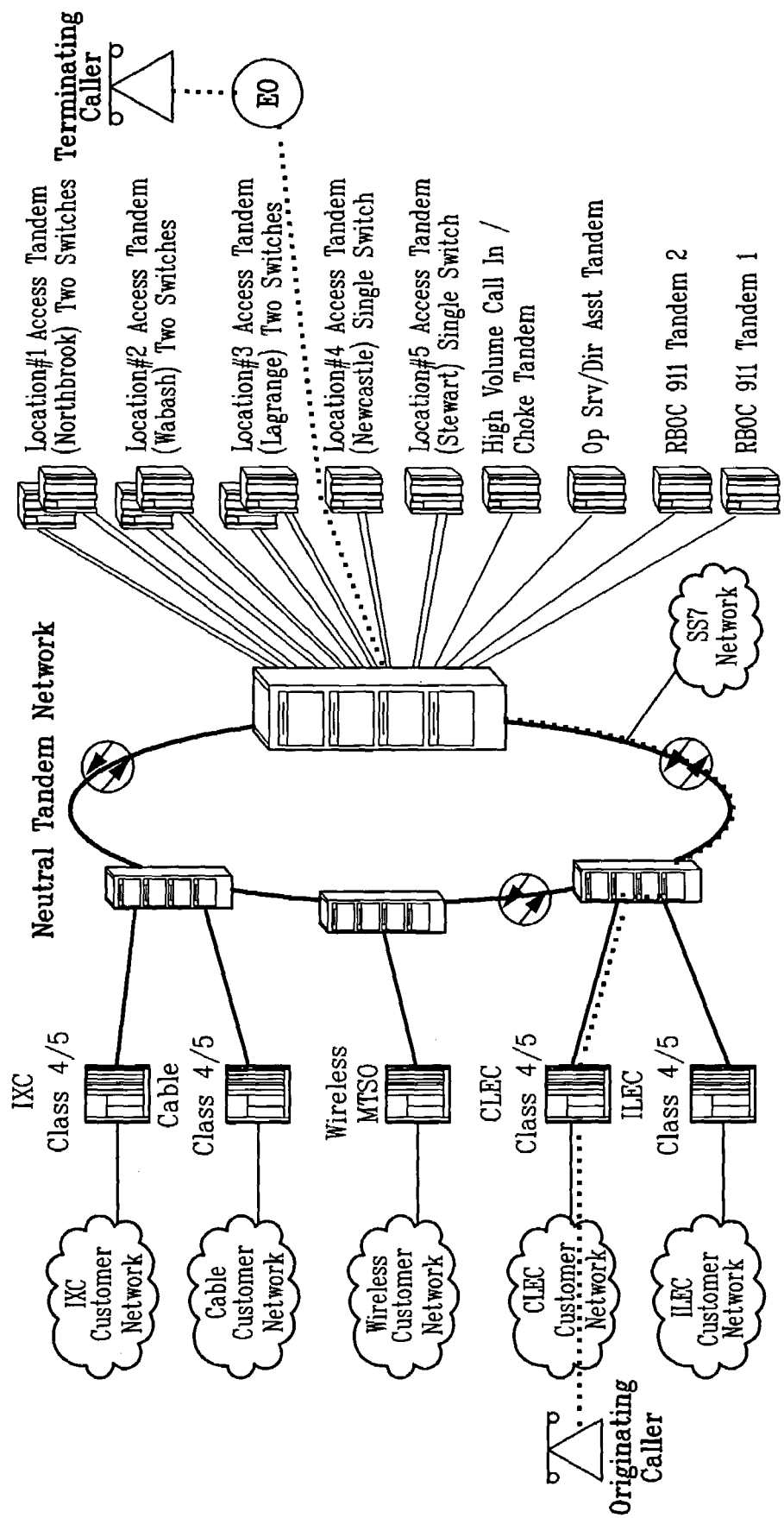
FIG. 20 illustrates a local call from a customer of an NTN-connected CLEC and an RBOC local service customer using the NTN of the invention.
Figure 21:
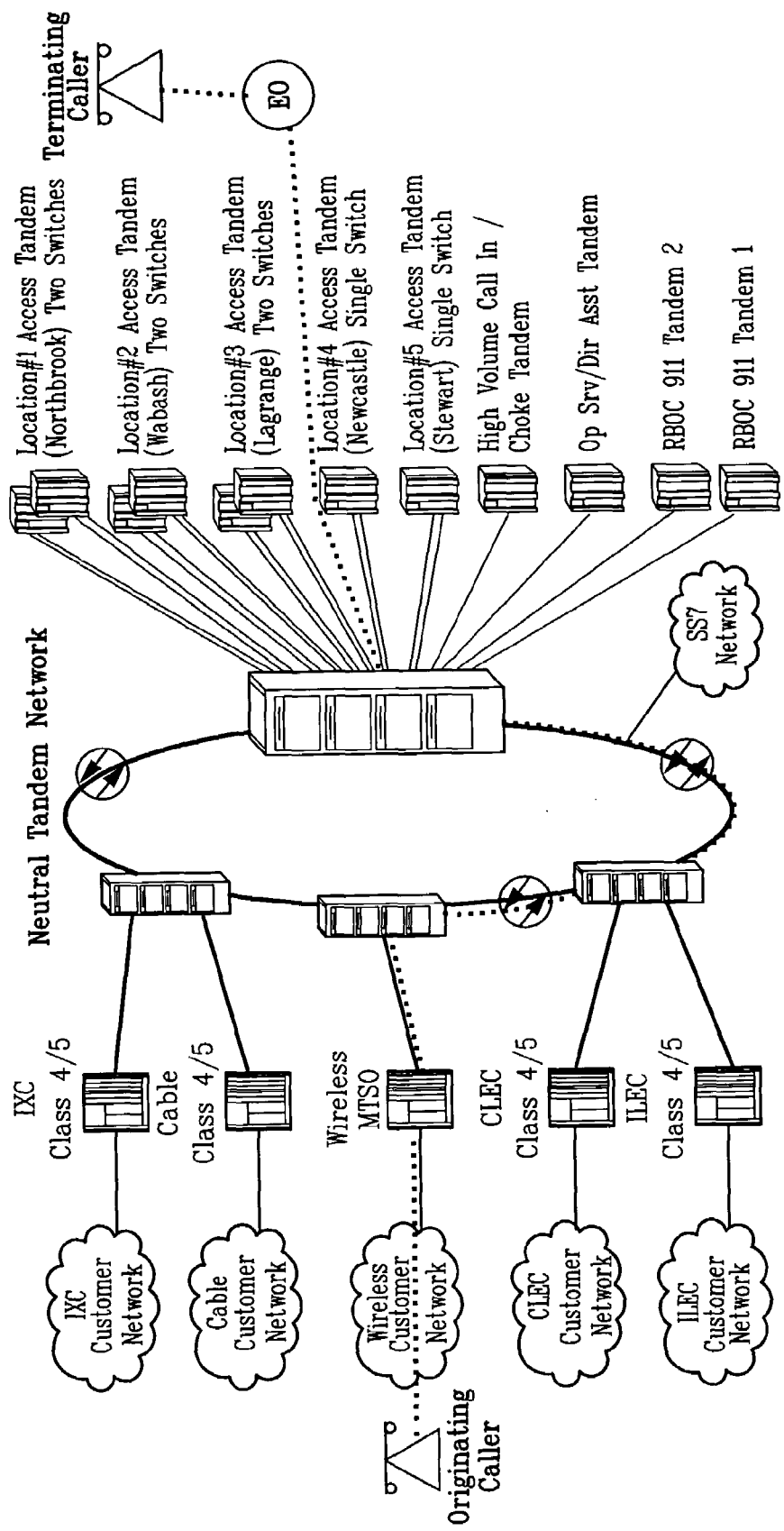
FIG. 21 illustrates a local call from a customer of an NTN-connected wireless carrier terminating to an RBOC local service customer using the NTN of the invention.

Examples of terminating call routing to RBOC end offices over the NTN 40 of the invention will now be illustrated with respect to FIGS. 19–21.

FIG. 19 illustrates a long distance call from a customer of an NTN-connected long distance carrier 48 and an RBOC local service customer. As illustrated, a customer of an NTN-connected long distance carrier goes off-hook at their premises 96, dials a long distance call—e.g., 1+area code+ terminating telephone number. The call is routed by the serving local exchange carrier to the customer's preferred long distance carrier's Point of Presence ("POP"). At the POP, the long distance carrier's switch 14 reads the area code and first three digits of the terminating telephone number to determine the metropolitan area and tandem switch associated with the terminating telephone number and routes the call through its long distance network 48 to the terminating POP serving that metropolitan area. Because the long distance carrier has connected the terminating POP to the NTN 40 for that metropolitan area, the call is routed to the NTN 40 for termination over the transport facility 49 between the long distance carrier 48 and the NTN 40. The call is received at the NTN 40 with the terminating area code and telephone number. The NTN switch 41 looks up the terminating telephone number using its SS-7 database link 50 to determine the local carrier for the terminating the call. Upon looking up the telephone number, the NTN 40 determines that the RBOC is the terminating local carrier and that the RBOC end office 20 serving the called telephone number is connected to the NTN 40. The NTN switch 42 then routes the call over the transport 98 connecting the NTN 40 to the terminating end office. The call then proceeds over an interconnection facility into the RBOC's network to its Class 5 switch, which translates the terminating telephone number into a local loop terminating at the called party's premise 100.

FIG. 20 illustrates a local call from a customer of an NTN-connected CLEC 54 and an RBOC local service customer 100. As illustrated, a customer of an NTN-connected CLEC 54 goes off-hook at their premises 102 and dials a local call—e.g., seven-digit terminating telephone number. The calling party's CLEC switch 14 reads the terminating telephone number to determine that it is a local area call and looks up the terminating telephone number using its SS-7 database link 50 to determine the local carrier for the terminating the call and routing path for terminating the call. Upon looking up the telephone number, the CLEC determines that the RBOC terminating local end office 20 is also connected to the NTN 40. The call is then routed over the hardwire connection 52 between CLEC 54 and the NTN 40. The call is received at the NTN switch 42 with the terminating telephone number and routing information showing the RBOC is the terminating local carrier and that the RBOC end office 20 serving the called telephone number is connected to the NTN 40. The NTN switch 42 then routes the call over the transport 98 connecting the NTN 40 to the terminating RBOC end office 20. The call then proceeds over an interconnection facility into the RBOC's network to its Class 5 switch, which translates the terminating telephone number into a local loop terminating at the called party's premise 100.

FIG. 21 illustrates a local call from a customer of an NTN-connected wireless carrier 72 terminating to an RBOC local service customer 100. As illustrated, a customer 104 of an NTN-connected wireless carrier 72 dials a local call— e.g., seven-digit terminating telephone number. The calling party's MTSO switch 74 reads the terminating telephone number to determine that it is a local area call and looks up the terminating telephone number using its SS-7 database link 50 to determine the local carrier for the terminating the call and routing path for terminating the call. Upon looking up the telephone number, the wireless carrier 72 determines that the RBOC terminating local end office 20 is also connected to the NTN 40. The call is then routed over the hardwire connection 70 between wireless carrier 72 and the NTN 40. The call is received at the NTN switch 42 with the terminating telephone number and routing information showing the RBOC is the terminating local carrier and that the RBOC end office 20 serving the called telephone number is connected to the NTN 40. The NTN switch 42 then routes the call over the transport 98 connecting the NTN 40 to the terminating RBOC end office 20. The call then proceeds over an interconnection facility into the RBOC's network to its Class 5 switch, which translates the terminating telephone number into a local loop terminating at the called party's premise 100.

Examples of Advanced Traffic Call Routing over the NTN of the invention will now be described with respect to FIGS. 22 and 23.

Figure 22:
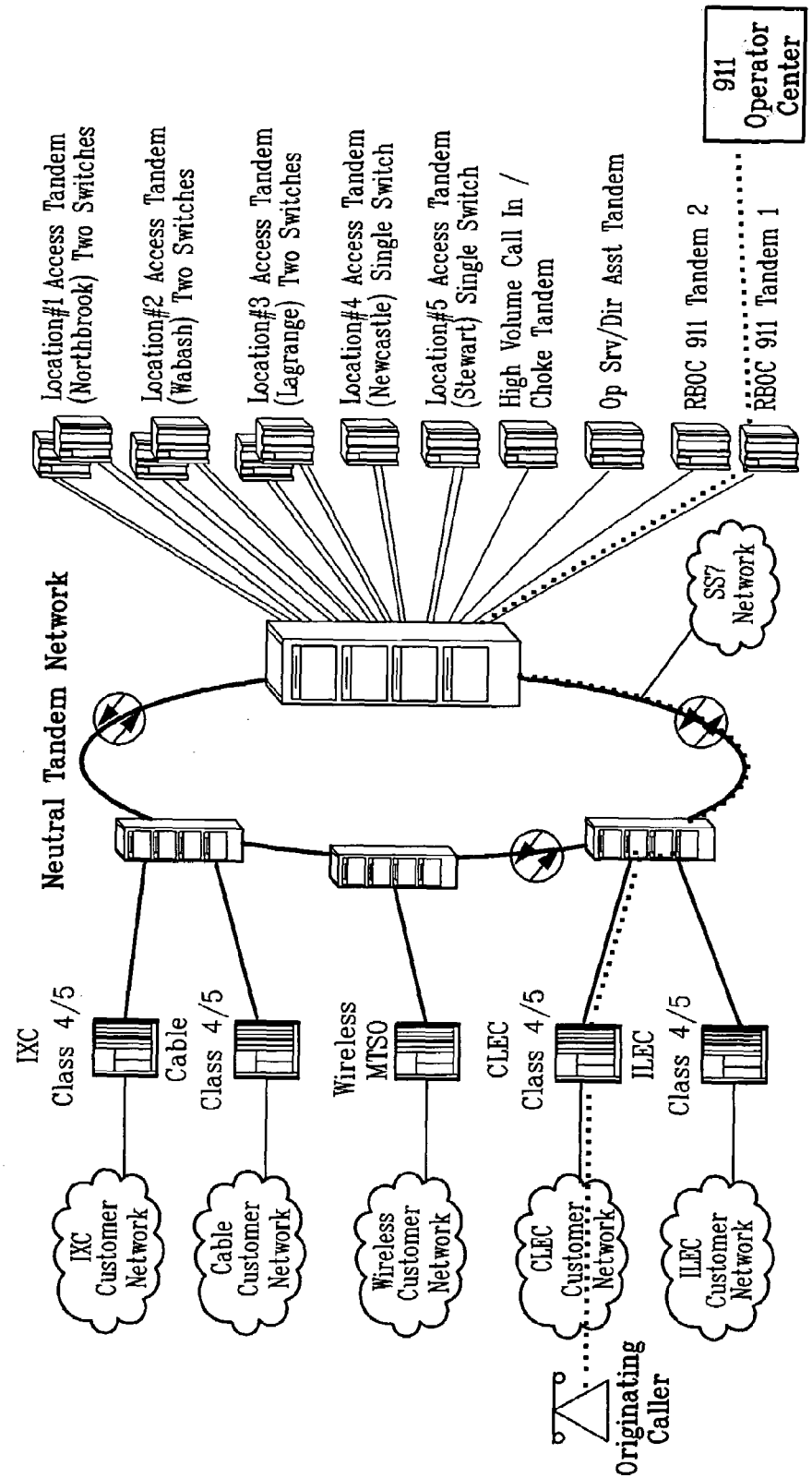
FIG. 22 illustrates a 911 call from a customer of an NTN-connected CLEC in accordance with the invention.

FIG. 22 illustrates a 911 call from a customer of an NTN-connected CLEC 54. As illustrated, a customer of an NTN-connected CLEC 54 goes off-hook at their premises 106 and dials 911. The calling party's CLEC switch 14 reads the terminating telephone number to determine that it is a 911 call and looks up the terminating telephone number using its SS-7 database link 50 to determine the routing path for terminating the call. Upon looking up the telephone number, the CLEC 54 determines that the relevant 911 access tandem 108 is connected to the NTN 40. The call is then routed over the hardwire connection 52 between CLEC Sand the NTN 40. The call is received at the NTN switch 42 with the terminating 911 telephone number and routing information showing the RBOC 911 access tandem 108 is connected to the NTN 40. The NTN switch 42 then routes the call over the transport 110 connecting the NTN 40 to the terminating RBOC 911 access tandem 108. The call then proceeds over an interconnection facility from the 911 access tandem 108 into the RBOC's network to the Class 5 switch serving the local emergency agency for the calling party, which translates the 911 number into a local loop terminating at the emergency agency's premise.

Figure 23:
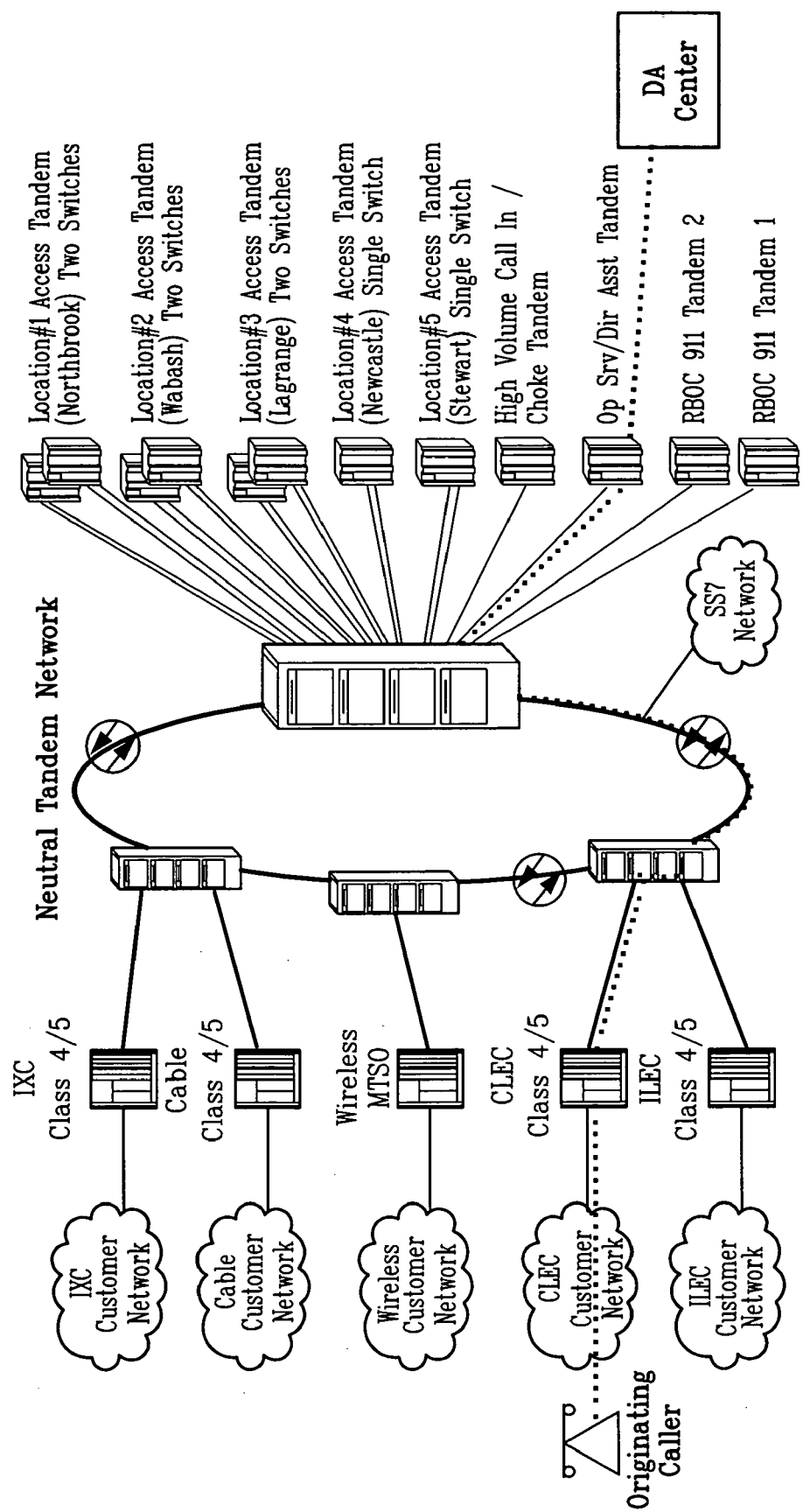
FIG. 23 illustrates a directory assistance call from a customer of an NTN-connected CLEC in accordance with the invention.

FIG. 23 illustrates a directory assistance call from a customer of an NTN-connected CLEC 54. As illustrated, a customer of an NTN-connected CLEC 54 goes off-hook at their premises 106 and dials 411. The calling party's CLEC switch 14 reads the terminating telephone number to determine that it is a 411 call and looks up the terminating telephone number using its SS-7 database link 50 to determine the routing path for terminating the call. Upon looking up the telephone number, the CLEC 54 determines that the relevant 411 directory assistance access tandem 112 is connected to the NTN 40. The call is then routed over the hardwire connection 52 between CLEC 54 and the NTN 40. The call is received at the NTN switch 42 with the terminating 411 telephone number and routing information showing the RBOC 411 directory assistance access tandem 112 is connected to the NTN 40. The NTN switch 42 then routes the call over the transport 114 connecting the NTN 40 to the terminating RBOC 411 access tandem 112. The call then proceeds over an interconnection facility from the 411 directory assistance access tandem 112 into the RBOC's network to its directory assistance center. Those skilled in the art will appreciate that the NTN platform of the invention permits a number of system enhancements. For example, the soft switch platform may incorporate an enterprise communications server application which will allow voice, data, video, wireless, and other types of communications between end-points such as voice terminals, data terminals, computers, transceivers, and the like on a private or virtual private network basis.

Although exemplary embodiments of the invention have been described in detail above, those skilled in the art will readily appreciate that many additional modifications are possible in the exemplary embodiment without materially departing from the novel teachings and advantages of the invention. For example, those skilled in the art will appreciate that in each case the T1 data lines described may be T1 or greater high capacity data lines (e.g., T3, OC3, OC12). In addition, those skilled in the art will appreciate that other telephone equipment besides a soft switch may be used to provide the switching and tandem. The remote and main switching terminals may use any of a number of wired or wireless protocols. Accordingly, these and all such modifications are intended to be included within the scope of this invention as defined in the following claims.

I claim:

1. A Neutral Tandem Network ("NTN") that provides transit traffic amongst public and private wireline and wireless carrier networks, comprising:
    at least one switch for cross-connecting each of a plurality of inputs to at least one of a plurality of outputs;
    a plurality of tandem access points for connection to switches of a plurality of said public and private wireline and wireless carrier networks, said switches including tandem switches; and
    a network connecting said tandem access points to said at least one switch and said network managing the efficient routing of transit traffic between said plurality of tandem access points and said switch.

2. A Neutral Tandem Network as in claim 1, wherein at least one of said tandem access points terminates incoming calls to an incumbent LEC tandem or central office.

3. A Neutral Tandem Network as in claim 1, further comprising a plurality of tandem trunk group access points connected to said network for connection to a plurality of trunk groups.

4. A Neutral Tandem Network as in claim 3, wherein at least one of said tandem trunk group access points terminates incoming calls to at least one of emergency 911 services, directory assistance services, and operator services tandems.

5. A Neutral Tandem Network as in claim 1, wherein said at least one switch comprises a plurality of switches connected to said network so as to provide distributed switching of data amongst said plurality of tandem access points.

6. A Neutral Tandem Network as in claim 1, wherein said at least one switch comprises a soft switch.

7. A Neutral Tandem Network as in claim 6, wherein said network transmits data between said tandem access points and said soft switch as data packets.

8. A Neutral Tandem Network as in claim 6, wherein said soft switch manages devices in said network to set up calls across IP, ATM, and circuit networks.

9. A Neutral Tandem Network as in claim 8, wherein said soft switch maintains network policy information for said network on services, routing, and provisioning and applies the network policies to determine how calls should be handled by said IP, ATM, and/or circuit networks.

10. A Neutral Tandem Network as in claim 6, wherein said network provides overflow capacity for transit traffic by routing transit traffic to a tandem that may provide an alternate route to a called party.

11. A Neutral Tandem Network as in claim 1, wherein said network comprises fiber transport cables and a plurality of fiber terminals interconnecting said at least one switch and said plurality of tandem access points.

12. A method of providing transit traffic amongst a plurality of public and private wireline and wireless carrier networks, comprising:
    creating a distributed switching network at a higher level in a switching hierarchy including Regional Bell Operating Company (RBOC) tandems and that is independent of said plurality of public and private wireline and wireless carrier networks, said distributed switching network comprising at least one switch, a plurality of tandem access points, and a network connecting said tandem access points to said at least one switch;
    connecting switches of each carrier network, said switches including tandem switches of said plurality of public and private wireline and wireless carrier networks, to at least one of said tandem access points;
    switching transit traffic amongst switches of the carrier networks connected to said distributed switching network using said at least one switch; and
    said distributed switching network managing the efficient routing of transit traffic between said plurality of tandem access points and said switch.

13. A method as in claim 12, comprising the further steps of connecting a RBOC switching network to said distributed switching network and terminating traffic to said RBOC switching network.

14. A method as in claim 12, comprising the further steps of providing a plurality of tandem trunk group access points on said distributed switching network and connecting each tandem trunk group access point to a trunk group including at least one of an emergency 911 services tandem, a directory assistance services tandem, and an operator services tandem.

15. A method as in claim 12, comprising the further step of maintaining said distributed switching network financially and physically independent of each carrier network.

16. A method as in claim 12, wherein said switching step comprises the step of transmitting data packets from a tandem access point to said at least one switch over said network.

17. A method as in claim 12, wherein said step of managing the efficient routing of transit traffic between said plurality of tandem access points and said switch comprises the step of managing devices in said distributed switching network to set up calls across IP, ATM, and circuit networks.

18. A method as in claim 17, wherein said step of managing the efficient routing of transit traffic between said plurality of tandem access points and said switch comprises the steps of maintaining network policy information for said distributed switching network on services, routing, and provisioning and applying the network policies to determine how calls should be handled by said IP, ATM, and/or circuit networks.

19. A method as in claim 12, wherein said step of managing the efficient routing of transit traffic between said plurality of tandem access points and said switch comprises providing overflow capacity for transit traffic by routing transit traffic to a tandem that may provide an alternate route to a called party.

20. A method of switching transit traffic from a first wireline or wireless carrier network to a second wireline or wireless carrier network, comprising the steps of:
routing transit traffic in said first wireline or wireless carrier network via a first tandem access point to a switch connected to said first tandem access point by a distributed switching network at a higher level in a switching hierarchy including Regional Bell Operating Company (RBOC) tandems and that is independent of said first and second wireline or wireless carrier networks;
routing said transit traffic from said switch via said distributed switching network to a second tandem access point connected to said second wireline or wireless carrier network;
switching said transit traffic between said first and second wireline or wireless carrier networks using said switch; and
said distributed switching network managing, independent of said first and second wireline or wireless carrier networks, the efficient routing of transit traffic between said tandem access points and said switch.

21. A method as in claim 20, wherein said step of managing the efficient routing of transit traffic between said tandem access points and said switch comprises the step of managing devices in said distributed switching network to set up calls across IP, ATM, and circuit networks.

22. A method as in claim 21, wherein said step of managing the efficient routing of transit traffic between said tandem access points and said switch comprises the steps of maintaining network policy information for said distributed switching network on services, routing, and provisioning and applying the network policies to determine how calls should be handled by said IP, ATM, and/or circuit networks.

23. A method as in claim 20, wherein said step of managing the efficient routing of transit traffic between said plurality of tandem access points and said switch comprises providing overflow capacity for transit traffic by routing transit traffic to a tandem that may provide an alternate route to a called party.

* * * * *

(12) INTER PARTES REEXAMINATION CERTIFICATE (828th)
United States Patent
Gavillet

(10) Number: US 7,123,708 C1
(45) Certificate Issued: Feb. 25, 2014

(54) NEUTRAL TANDEM TELECOMMUNICATIONS NETWORK PROVIDING TRANSITING, TERMINATING, AND ADVANCED TRAFFIC ROUTING SERVICES TO PUBLIC AND PRIVATE CARRIER NETWORKS

(75) Inventor: Ronald William Gavillet, Glencoe, IL (US)

(73) Assignee: Venture Lending & Leasing IV, Inc., San Jose, CA (US)

Reexamination Request:
No. 95/000,530, Jan. 28, 2010

Reexamination Certificate for:
Patent No.: 7,123,708
Issued: Oct. 17, 2006
Appl. No.: 10/087,363
Filed: Mar. 1, 2002

Related U.S. Application Data

(60) Provisional application No. 60/272,437, filed on Mar. 1, 2001.

(51) Int. Cl.
*H04M 7/00* (2006.01)
(52) U.S. Cl.
USPC ..................... 379/219; 379/220.01
(58) Field of Classification Search
USPC ........................................ 379/219
See application file for complete search history.

(56) References Cited

To view the complete listing of prior art documents cited during the proceeding for Reexamination Control Number 95/000,530, please refer to the USPTO's public Patent Application Information Retrieval (PAIR) system under the Display References tab.

*Primary Examiner* — Ovidio Escalante

(57) ABSTRACT

A neutral tandem telecommunications network providing public and private wireline and wireless carrier networks connectivity amongst themselves ("transit traffic") and between themselves and metropolitan local exchange carrier ("LEC") central offices ("terminating traffic") as a substitute for utilizing the LEC public switched telephone network ("PSTN") tandems. Telecommunications switching equipment for a Neutral Tandem Network ("NTN") is located at various points in a metropolitan area and used to provide switching connectivity services for traffic passing (i) between carrier networks connected at any point to the NTN as well as (ii) between the carrier networks and the metropolitan LEC central offices and (iii) between the carrier networks and advanced traffic routing services. The services are provided using a metropolitan switch or a soft switch as a higher level in the switching hierarchy above the current RBOC tandems, where the switch has hardwired connections (i) between metropolitan carrier networks and the NTN and (ii) between the NTN and LEC central offices and tandems.

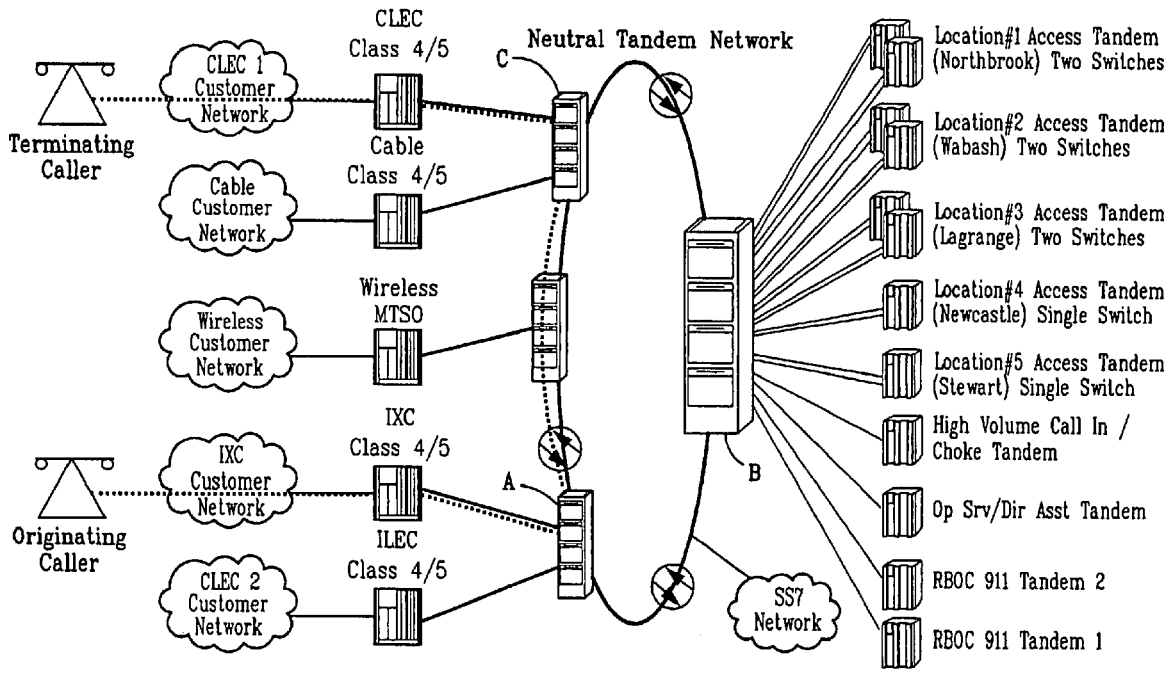

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-23 are cancelled.

\* \* \* \* \*